(12) United States Patent
Choi et al.

(10) Patent No.: US 11,195,096 B2
(45) Date of Patent: Dec. 7, 2021

(54) FACILITATING NEURAL NETWORK EFFICIENCY

(71) Applicant: International Business Machines Corporation, Armonk, NY (US)

(72) Inventors: Jungwook Choi, Yorktown Heights, NY (US); Kailash Gopalakrishnan, San Jose, CA (US); Charbel Sakr, Champaign, IL (US); Swagath Venkataramani, Yonkers, NY (US); Zhuo Wang, Mountainview, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1050 days.

(21) Appl. No.: 15/792,733

(22) Filed: Oct. 24, 2017

(65) Prior Publication Data
US 2019/0122116 A1    Apr. 25, 2019

(51) Int. Cl.
*G06N 3/04* (2006.01)
*G06N 3/08* (2006.01)

(52) U.S. Cl.
CPC ............... *G06N 3/084* (2013.01); *G06N 3/04* (2013.01)

(58) Field of Classification Search
CPC ................................. G06N 3/04; G06N 3/084
See application file for complete search history.

(56) References Cited

U.S. PATENT DOCUMENTS

| 5,493,632 A * | 2/1996 | Ahn | ...................... G06N 3/063 706/41 |
| 7,149,262 B1 * | 12/2006 | Nayar | ................... G06T 3/4015 375/341 |

(Continued)

FOREIGN PATENT DOCUMENTS

| CN | 106997485 A | 8/2017 |
| CN | 107229942 A | 10/2017 |

OTHER PUBLICATIONS

Cai et al., "Deep Learning with Low Precision by Half-Wave Gaussian Quantization", Jul. 2017, IEEE Xplore, pp. 5918-5926. (Year: 2017).*

(Continued)

*Primary Examiner* — Paulinho E Smith
(74) *Attorney, Agent, or Firm* — Amin, Turocy & Watson, LLP

(57) ABSTRACT

Techniques that facilitate improving an efficiency of a neural network are described. In one embodiment, a system is provided that comprises a memory that stores computer-executable components and a processor that executes computer-executable components stored in the memory. In one implementation, the computer-executable components comprise an initialization component that selects an initial value of an output limit, wherein the output limit indicates a range for an output of an activation function of a neural network. The computer-executable components further comprise a training component that modifies the initial value of the output limit during training to a second value of the output limit, the second value of the output limit being provided as (Continued)

a parameter to the activation function. The computer-executable components further comprise an activation function component that determines the output of the activation function based on the second value of the output limit as the parameter.

21 Claims, 21 Drawing Sheets

(56) References Cited

U.S. PATENT DOCUMENTS

| | | | | |
|---|---|---|---|---|
| 10,127,495 | B1* | 11/2018 | Bopardikar | G06K 9/00288 |
| 10,621,486 | B2* | 4/2020 | Yao | G06F 7/5443 |
| 10,728,553 | B2* | 7/2020 | Xu | G06N 3/04 |
| 2006/0251330 | A1* | 11/2006 | Toth | G06N 3/084 |
| | | | | 382/236 |
| 2015/0120627 | A1 | 4/2015 | Hungzinger et al. | |
| 2015/0269480 | A1 | 9/2015 | Levin et al. | |
| 2016/0086078 | A1* | 3/2016 | Ji | G06K 9/6272 |
| | | | | 382/157 |
| 2017/0032247 | A1* | 2/2017 | Tadesse | G06N 20/00 |
| 2017/0286830 | A1* | 10/2017 | El-Yaniv | G06N 3/0481 |
| 2018/0046894 | A1* | 2/2018 | Yao | G06F 7/5443 |
| 2018/0129935 | A1* | 5/2018 | Kim | G06N 3/082 |
| 2018/0174022 | A1* | 6/2018 | Young | G06N 3/063 |
| 2018/0181859 | A1* | 6/2018 | Young | G06N 7/005 |
| 2018/0204110 | A1* | 7/2018 | Kim | G06N 3/0454 |
| 2018/0225116 | A1* | 8/2018 | Henry | G06N 3/063 |
| 2018/0336469 | A1* | 11/2018 | O'Connor | G06N 3/084 |
| 2018/0341857 | A1* | 11/2018 | Lee | G06N 3/0454 |
| 2019/0012559 | A1* | 1/2019 | Desappan | G06K 9/6273 |
| 2019/0042948 | A1* | 2/2019 | Lee | G06N 3/063 |
| 2019/0080223 | A1* | 3/2019 | Fraser | G06N 3 |
| 2019/0095777 | A1* | 3/2019 | Kim | G06N 3/063 |
| 2019/0122116 | A1* | 4/2019 | Choi | G06N 3/0481 |
| 2019/0156192 | A1* | 5/2019 | Dasgupta | G06K 9/6219 |
| 2019/0171935 | A1* | 6/2019 | Agrawal | G06N 3/0445 |
| 2019/0385050 | A1* | 12/2019 | Wang | G06N 3/04 |
| 2020/0097826 | A1* | 3/2020 | Du | G06N 3/0454 |
| 2020/0226459 | A1* | 7/2020 | Chen | G06N 3/08 |
| 2021/0064954 | A1* | 3/2021 | Choi | G06N 3/04 |
| 2021/0064985 | A1* | 3/2021 | Sun | G06N 3/04 |
| 2021/0125063 | A1* | 4/2021 | Park | G06N 3/0454 |

OTHER PUBLICATIONS

Rastegari et al., "XNOR-Net: ImageNet Classification Using Binary Convolutional Neural Networks", Aug. 2, 2016, pp. 1-17 (Year: 2016).*
Vivienne Sze, Efficient Processing of Deep Neural Networks: A Tutorial and Survey, IEE, Aug. 13, 2017, 32 pages.
Paul A. Merolla, A Million Spiking-Neuron Integrated Circuit With a Scalable Communication Network and Interface, www.http://science.sciencemag.org/, Sep. 17, 2019, 7 pages.
Wolfgang Maass, Energy-Efficient Neural Network Chips Approach Human Recognition Capabilities, www.pnas.org/cg/doi/10.1073/pnas.1614109113, Oct. 11, 2016, 3 pages.
Jacha Kung, Efficient Object Detection Using Embedded Binarized Neural Networks, Springer Science+Business Media, Mar. 13, 2017, 14 pages.
Yunchao Gong, Compressing Deep Convolutional Networks Using Vector Quantization, Facebook AI Research, Dec. 18, 2014, 10 pages.
Matthieu Courbariaux, BinaryConnect: Training Deep Neural Networks With Binary Weights During Propagations, https://github.com/MatthieuCourbariaux/BinaryConnect, 2015, 9 pages.
Atilim Gunes Baydin, Tricks from Deep Learning, https://arxiv.org/abs/1611.03777v1, Nov. 10, 2014, 4 pages.
Yoshua Bengio, Estimating or Propagating Gradients Through Stochastic Neurons for Conditional Computation, http://arxiv.org/abs/1308.3432, Aug. 15, 2013, 12 pages.
Mohammad Rastegari, XNOR-Net: ImageNet Classification Using Binary Convolutional Neural Networks, http://arxiv.org/abs/1603.05279, Aug. 2, 2016, 17 pages.
Shuchang Zhou, DoReFa—Net: Training Low Bitwidth Convolutional Neural Networks with Low Bitwidth Gradients, http://arxiv.org/abs/1606.06160, Jul. 17, 2016, 14 pages.
Itay Hubara, Quantized Neural Networks: Training Neural Networks with Low Precision Weights and Activations, http://arxiv.org/abs/1609.07061, Sep. 22, 2016, 29 pages.
Charbel Sakr, Analytical Guarantees on Numerical Precision of Deep Neural Networks (International Conference on Machine Learning), http://proceedings.mlr.press/v70/sakr17a.html, Aug. 26, 2017, 13 pages.
Zhouhan Lin, Neural Networks with Few Multiplications, https://arxiv.org/abs/1510.03009, Feb. 26, 2016, 9 pages.
International Search Report and Written Opinion for International Application Serial No. PCT/IB2018/057712 dated Jan. 30, 2019, 9 pages.

* cited by examiner

FACILITATING NEURAL NETWORK EFFICIENCY

BACKGROUND

The subject disclosure relates to facilitating an efficiency within a neural network.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments, systems, computer-implemented methods, apparatus and/or computer program products that facilitate neural network efficiency.

According to an embodiment, a system is provided that can comprise a memory that stores computer-executable components and a processor that executes computer-executable components stored in the memory. In one or more implementations, the computer-executable components comprise an initialization component that selects an initial value of an output limit, wherein the output limit indicates a range for an output of an activation function of a neural network. The computer-executable components further comprise a training component that modifies the initial value of the output limit during training to a second value of the output limit, the second value of the output limit being provided as a parameter to the activation function. The computer-executable components further comprise an activation function component that determines the output of the activation function based on the second value of the output limit as input.

In another embodiment, a computer-implemented method is provided. In one example, the computer-implemented method comprises initializing, by a system operatively coupled to a processor, a value for an output limit, wherein the output limit comprises a range for an output of an activation function of a neural network, the value for the output limit being determined via training. The computer-implemented method can further comprise 'determining, by the system, the output of the activation function given the value of the output limit as a parameter to the activation function.

In another embodiment, a computer program product that facilitates training quantized activations for efficient implementation of deep learning is provided, the computer program product comprising a computer readable storage medium having program instructions embodied therewith. The program instructions executable by a processor can cause the processor to at least initialize a value for an output limit, wherein the output limit comprises a range for an output of an activation function of a neural network, the value for the output limit being determined via training. The program instructions executable by a processor can further cause the processor to at least determine the output of the activation function given the value of the output limit as a parameter to the activation function.

In another embodiment, a system is provided that can comprise a memory that stores computer-executable components and a processor that executes computer-executable components stored in the memory. In one or more implementations, the computer-executable components comprise an initialization component that selects a value for an output limit, wherein the output limit comprises a range for an output of an activation function of a neural network, the value for the output limit being determined via training. The computer-executable components can also comprise an activation function component that determines the output of the activation function given the value of the output limit as a parameter to the activation function.

In another embodiment, a computer-implemented method is provided. In one example, the computer-implemented method comprises initializing, by a system operatively coupled to a processor, an initial value of an output limit, wherein the output limit comprises a range for an output of an activation function of a neural network. The computer-implemented method can further comprise modifying, by the system, the initial value of the output limit during training to a second value of the output limit, the second value of the output limit being provided as a parameter to the activation function. The computer-implemented method can further comprise determining, by the system, the output of the activation function given the second value of the output limit as the parameter.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

The subject disclosure is directed to computer processing systems, computer-implemented methods, apparatus and/or computer program products that facilitate an efficiency within a neural network. A neural network (sometimes referred to as an artificial neural network, or a deep neural network) generally is a computer system that seeks to mimic a brain. A neural network can be utilized in a variety of ways, such as by being trained to identify the presence of human faces in images, or translate spoken speech from a first language to a second language.

A neural network generally contains a plurality of neurons, and connections between those neurons. A neuron generally is a part of a neural network computer system that determines an output based on one or more inputs (that can be weighted), and the neuron can determine this output based on determining the output of an activation function with the possibly-weighted inputs. Examples of activation functions include a rectifier (ReLU) activation function, which produces an output that ranges between 0 and infinity, inclusive; tan h, which produces an output that ranges between −1 and 1, inclusive; and sigmoid, which produces an output that ranges between 0 and 1, inclusive. While several of the non-limiting examples described herein concern a regularizer (ReLU) activation function, it can be appreciated that these techniques can be applied to other activation functions. For example, these techniques can be applied to determine an appropriate resolution of the output of a tan h activation function or a sigmoid activation function.

Figure 1:
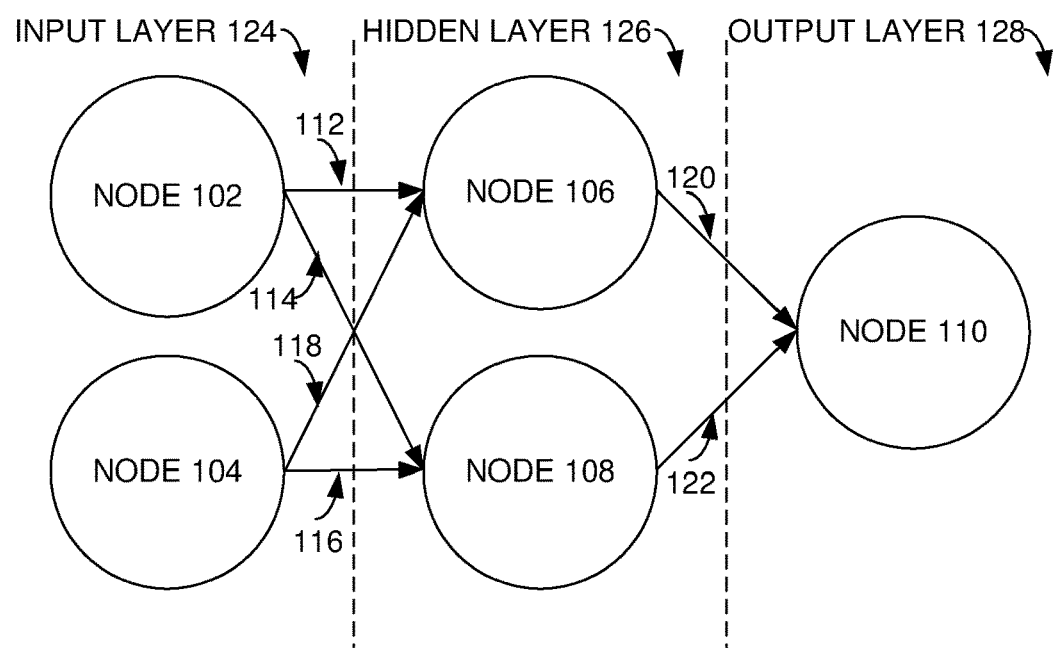
FIG. 1 illustrates an example, non-limiting neural network system for which an efficiency can be facilitated in accordance with one or more embodiments described herein.

The neurons of a neural network can be connected, so that the output of one neuron can serve as an input to another neuron. Neurons within a neural network can be organized into layers, as shown in FIG. 1. The first layer of a neural network can be called the input layer, the last layer of a neural network can be called the output layer, and any intervening layers of a neural network can be called a hidden layer.

Precision of a result can be important in a neural network, inasmuch as the precision of a neural network can affect the accuracy of a result produced by a neural network (e.g., an accuracy of identifying whether an image depicts a human face). But precision can be expensive (e.g., in terms of processing resources, time required to determine a result, or money required to build a suitable neural network to achieve a given level of precision). Then, to improve performance and lower cost of a neural network, lower-precision processing units can be incorporated (e.g., 8-, 4-, or 2-bit processing units, as opposed to 64- or 32-bit processing units).

However, when a neural network is trained while quantized to low precision, accuracy can be lost because of noise introduced via quantization. This reduced accuracy can diminish performance of the neural network, because the neural network's ability to recognize what it is trained to recognize can be diminished. Then, the present subject matter provides for decreasing precision in a neural network via quantization so that cost savings can be experienced, while mitigating a loss of accuracy in performance of the neural network.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

FIG. 1 illustrates an example, non-limiting neural network system for which an efficiency can be facilitated in accordance with one or more embodiments described herein. Aspects of systems (e.g., system 100 and the like), apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. Repetitive description of like elements employed in respective embodiments is omitted for sake of brevity.

The system 100 and/or the components of the system 100 can be employed to use hardware and/or software to solve problems that are highly technical in nature, that are not abstract and that cannot be performed as a set of mental acts by a human. For example, system 100 and/or the components of the system 100 can be employed to use hardware and/or software to perform operations including facilitating an efficiency within a neural network.

Further, some of the processes performed can be performed by specialized computers for carrying out defined tasks related to facilitating an efficiency within a neural network. System 100 and/or components of the system 100 can be employed to solve new problems that arise through advancements in technology, computer networks, the Internet and the like. System 100 can further provide technical improvements to live and Internet based learning systems by improving processing efficiency among processing components associated with facilitating an efficiency within a neural network.

As depicted, system 100 is a neural network comprising five neurons—neuron 102, neuron 104, neuron 106, neuron 108, and neuron 110. The input layer 124 of this neural network is comprised of neuron 102 and neuron 104. The hidden layer 126 of this neural network is comprised of neuron 106 and neuron 108. The output layer 128 of this neural network is comprised of neuron 110. Each of the neurons of input layer 124 is connected to each of the neurons of hidden layer 126. That is, a possibly-weighted output of each neuron of input layer 124 is used as an input to each neuron of hidden layer 126. Then, each of the neurons of hidden layer 126 is connected to each of the neurons (here, one neuron) of output layer 128.

The neural network of system 100 presents a simplified example so that certain features can be emphasized for clarity. It can be appreciated that the present techniques can be applied to other neural networks, including ones that are significantly more complex than the neural network of system 100.

Figure 16:
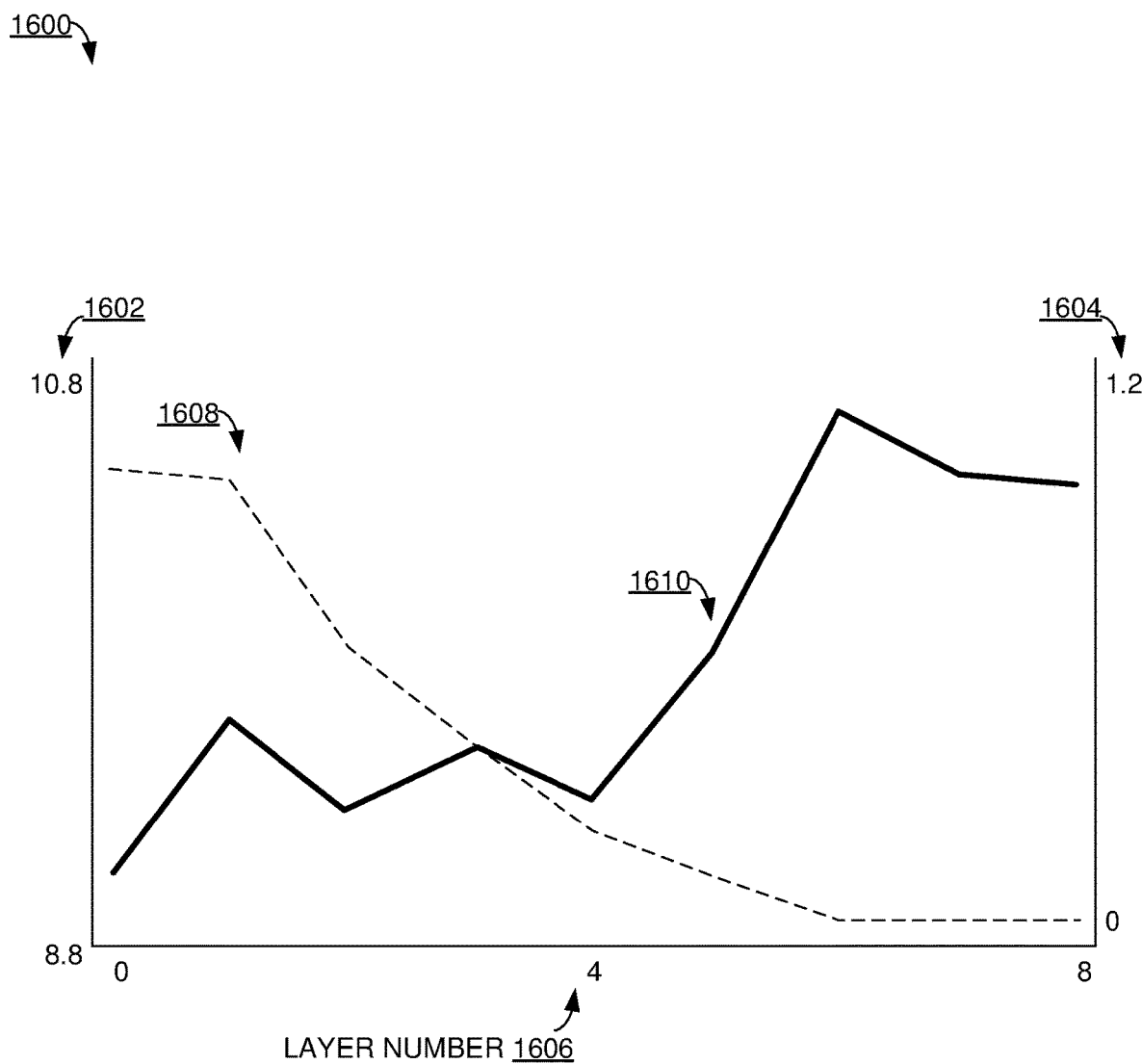
FIG. 16 illustrates a graph that shows how a compression rate of a range of an activation function corresponds to an associated test error, in accordance with one or more embodiments described herein.
Figure 17:
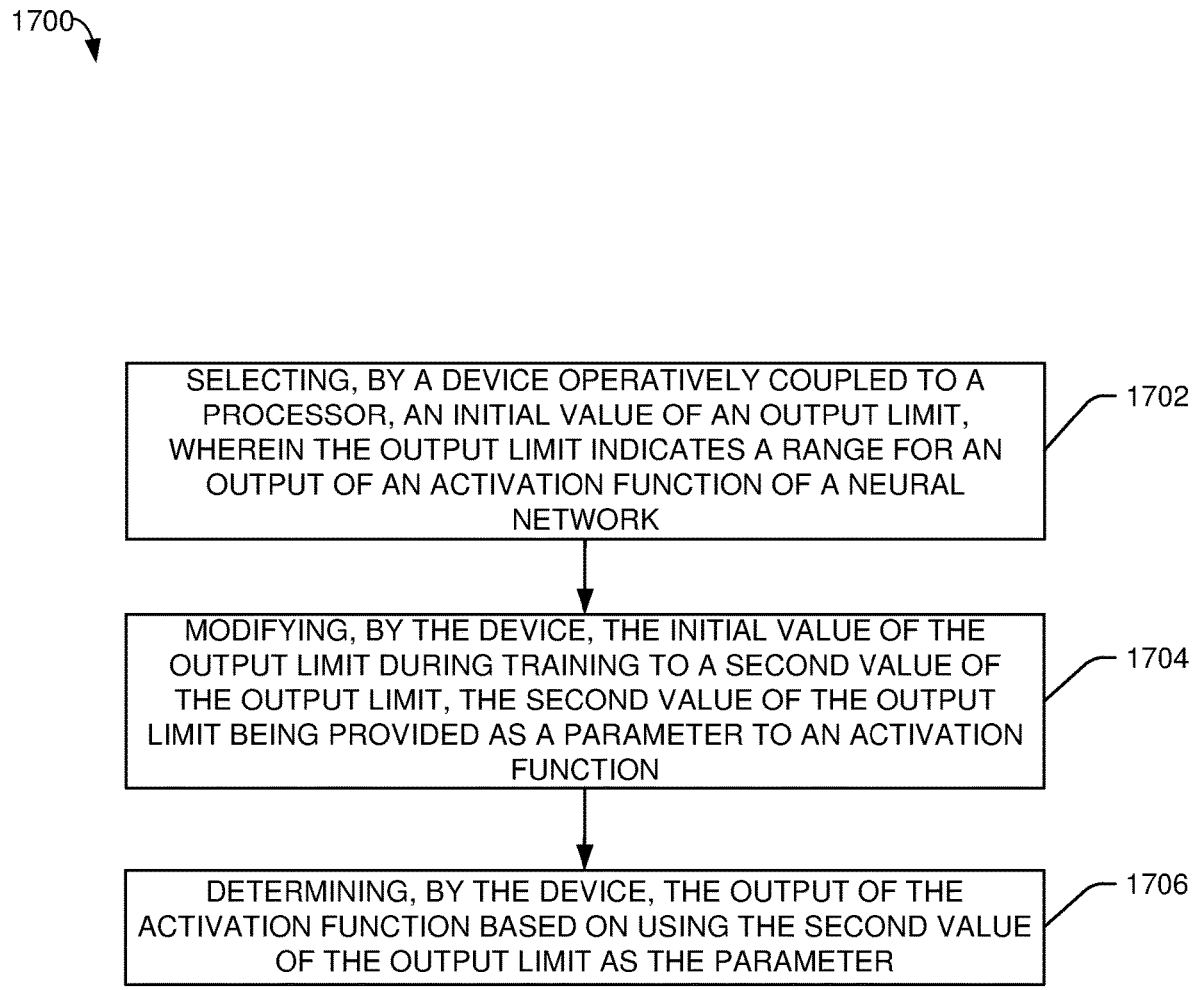
FIG. 17 illustrates a flow diagram of an example, non-limiting computer-implemented method that facilitates improving an efficiency of a neural network in accordance with one or more embodiments described herein.
Figure 18:
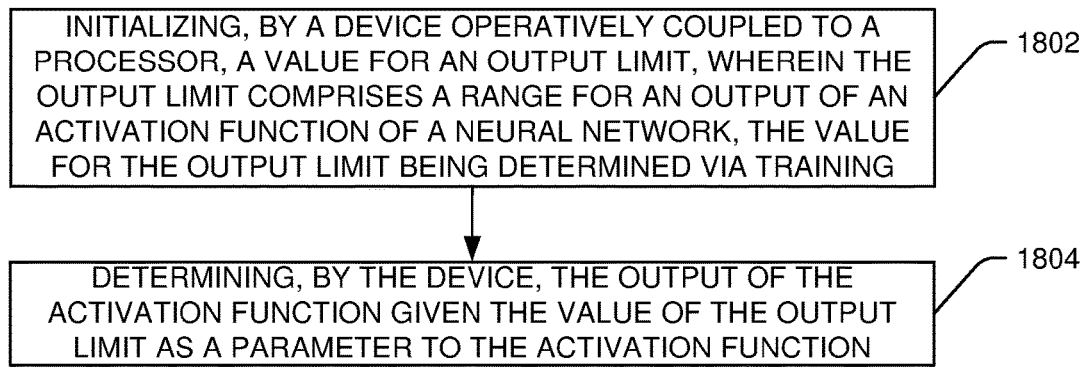
FIG. 18 illustrates a flow diagram of another example, non-limiting computer-implemented method that facilitates improving an efficiency of a neural network in accordance with one or more embodiments described herein.
Figure 19:
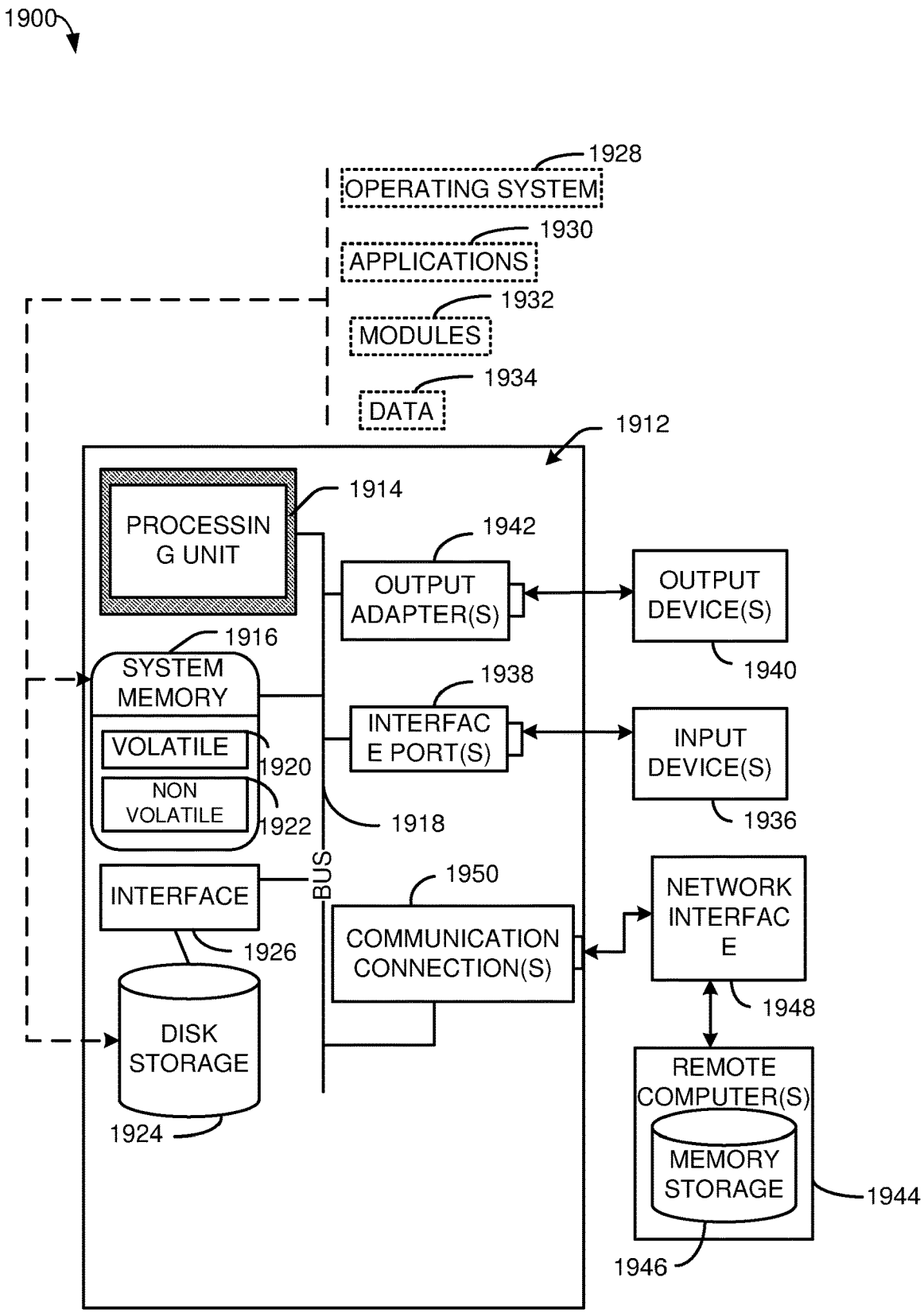
FIG. 19 illustrates a block diagram of an example non-limiting operating environment in which one or more embodiments described herein can be facilitated.

Given the context of the neural network of system 100 of FIG. 1, the graphs of FIGS. 3-16 illustrate various ways that an efficiency of a neural network can be facilitated, such as the neural network of system 100; the flow diagrams of FIGS. 17-18 illustrate computer-implemented methods that can be implemented to increase an efficiency of a neural network, such as the neural network of system 100; and the block diagram of FIG. 19 illustrates an operating environment in which a neural network can be implemented, such as the neural network of system 100.

Figure 2A:
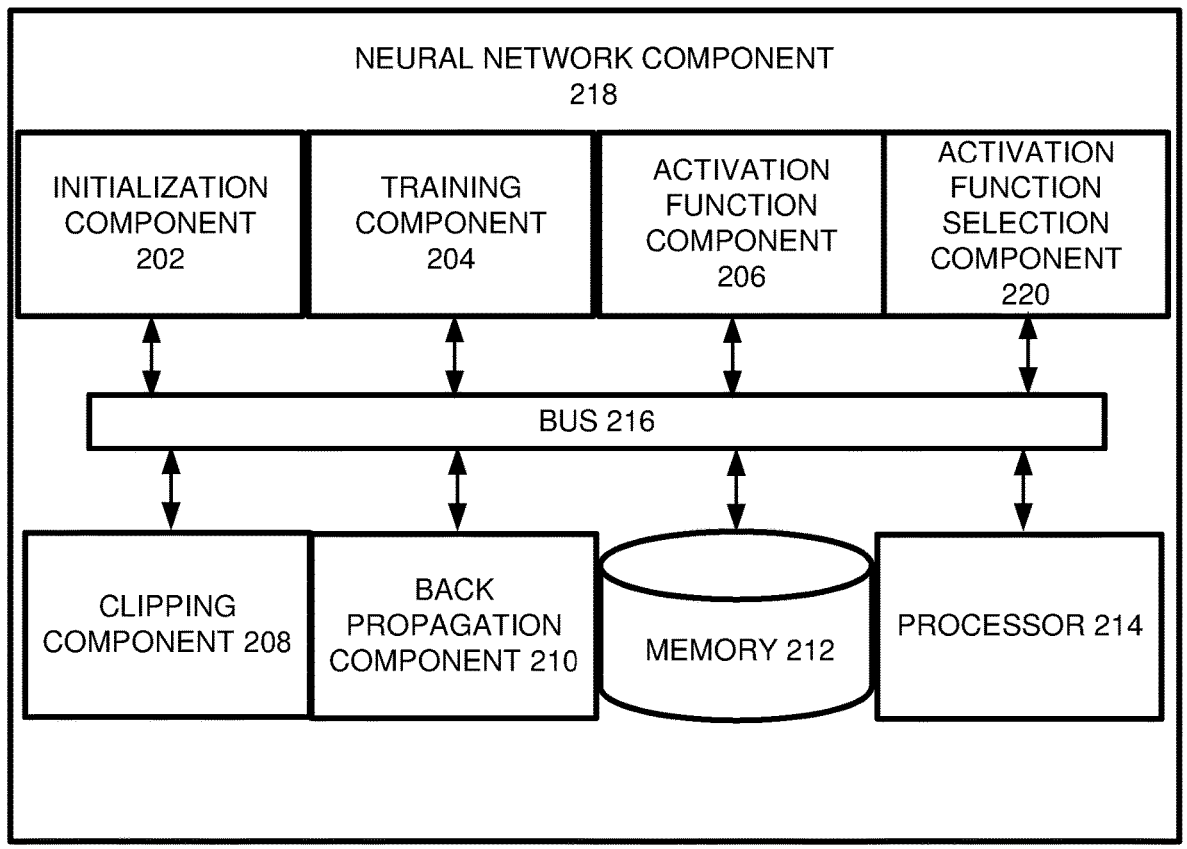
FIG. 2A illustrates a block diagram of an example, non-limiting system that facilitates an efficiency in a neural network in accordance with one or more embodiments described herein.

FIG. 2A illustrates a block diagram of an example, non-limiting system 200 that facilitates an efficiency in a neural network in accordance with one or more embodiments described herein. System 200 can include same or similar features and functionalities as systems 100 and 250 and vice versa. Repetitive description of like elements employed in respective embodiments is omitted for sake of brevity.

As shown in FIG. 2A, system 200 can include neural network component 218. Neural network component 218 can include various computer-executable components, including, but not limited to initialization component 202, training component 204, activation function component 206, clipping component 208, back propagation component 210, and activation function selection component 220. Neural network component 218 can also include or otherwise be associated with at least one memory 212 that stores computer-executable components (e.g., initialization component 202, training component 204, activation function component 206, clipping component 208, back propagation component 210, and activation function selection component 220). Neural network component 218 can also include or otherwise be associated with at least one processor 214 that executes the computer-executable instructions stored in memory 212. Neural network component 218 can further include a system bus 216 that can couple the various components including, but not limited to, initialization component 202, training component 204, activation function component 206, clipping component 208, back propagation component 210, activation function selection component 220, memory 212, and/or processor 214.

In order to facilitate an efficiency of a neural network, neural network component 218 can include initialization component 202. In some implementations, initialization component 202 can select an initial value of an output limit, wherein the output limit indicates a range for an output of an activation function of a neural network. Neural network component 218 can also include training component 204. In some implementations, training component 204 can modify the initial value of the output limit during training to a second value of the output limit, the second value of the output limit being provided as a parameter to the activation function. Neural network component 218 can also include activation function component 206. In some implementations, activation function component 206 can determine the output of the activation function based on using the second value of the output limit as the parameter.

Neural network component 218 can also include clipping component 208. In some implementations, clipping component 208 can perform clipping during training with the training component to reduce accuracy degradation due to quantization. Neural network component 218 can also include back propagation component 210. In some implementations, back propagation component 210 can perform back propagation during training with the training component. Neural network component 218 can also activation function selection component 220. In some implementations, activation function selection component 220 can determine to use a rectifier linear unit as the activation function in a case of full precision, and wherein cross entropy loss converges as the output limit increases; and determine that as the output limit increases, a loss function also increases with quantization, and determines to use an activation function type of the activation function that is other than a rectifier linear unit.

It should be appreciated that the architecture of system 200 can vary. For example, although various components of system 200 are depicted as being contained within neural network component 218, it may be appreciated that this arrangement is logical rather than indicating that the various components are contained within one device. That is, the various components may be distributed among various computing devices in a networked or distributed computing environment. It may also be appreciated that there may be other suitable architectures that employ more or fewer components than are depicted in system 200. For example, there may be another system that omits activation function selection component 220.

Figure 2B:
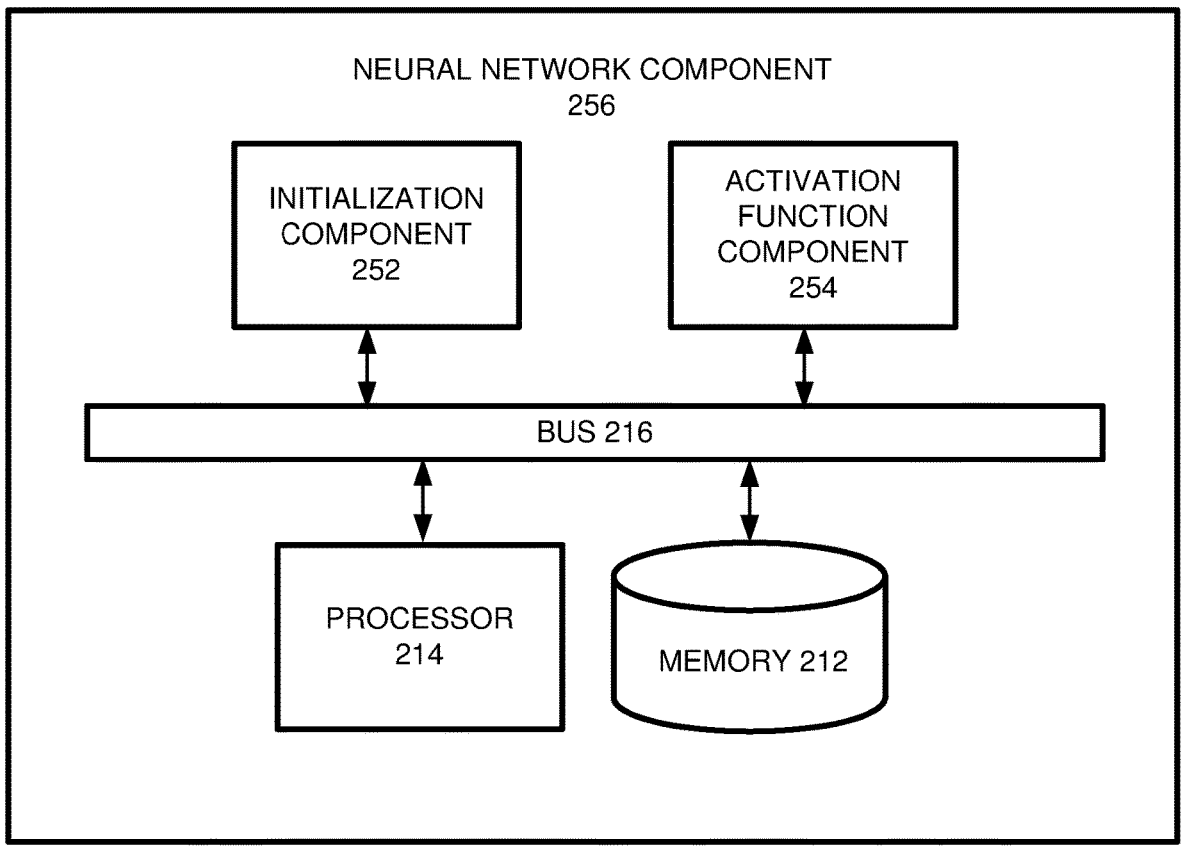
FIG. 2B illustrates another block diagram of an example, non-limiting system that facilitates an efficiency in a neural network with one or more embodiments described herein.

FIG. 2B illustrates another block diagram of an example, non-limiting system 250 that facilitates an efficiency in a neural network with one or more embodiments described herein. System 250 can include same or similar features and functionalities as systems 100 and 200 and vice versa. Repetitive description of like elements employed in respective embodiments is omitted for sake of brevity.

As shown in FIG. 2B, system 250 can include neural network component 256. Neural network component 256 can include various computer-executable components, including, but not limited to initialization component 252, and activation function component 254. Neural network component 256 can also include or otherwise be associated with at least one memory 212 that stores computer-executable components (e.g., initialization component 252 and activation function component 254). Neural network component 256 can also include or otherwise be associated with at least one processor 214 that executes the computer-executable instructions stored in memory 212. Neural network component 256 can further include a system bus 216 that can couple the various components including, but not limited to, initialization component 252, activation function component 254, memory 212, and/or processor 214.

In order to facilitate an efficiency of a neural network, neural network component 256 can include initialization component 252. In some implementations, initialization component 252 can select a value for an output limit, wherein the output limit comprises a range for an output of an activation function of a neural network, the value for the output limit being determined via training. Neural network component 256 can also include activation function component 254. In some implementations, activation function component 254 can determine the output of the activation function given the value of the output limit as a parameter to the activation function.

It should be appreciated that the architecture of system 250 can vary. For example, although various components of system 250 are depicted as being contained within neural network component 256, it may be appreciated that this arrangement is logical rather than indicating that the various components are contained within one device. That is, the various components may be distributed among various computing devices in a networked or distributed computing environment. It may also be appreciated that there may be other suitable architectures that employ more or fewer components than are depicted in system 250.

Figure 3:
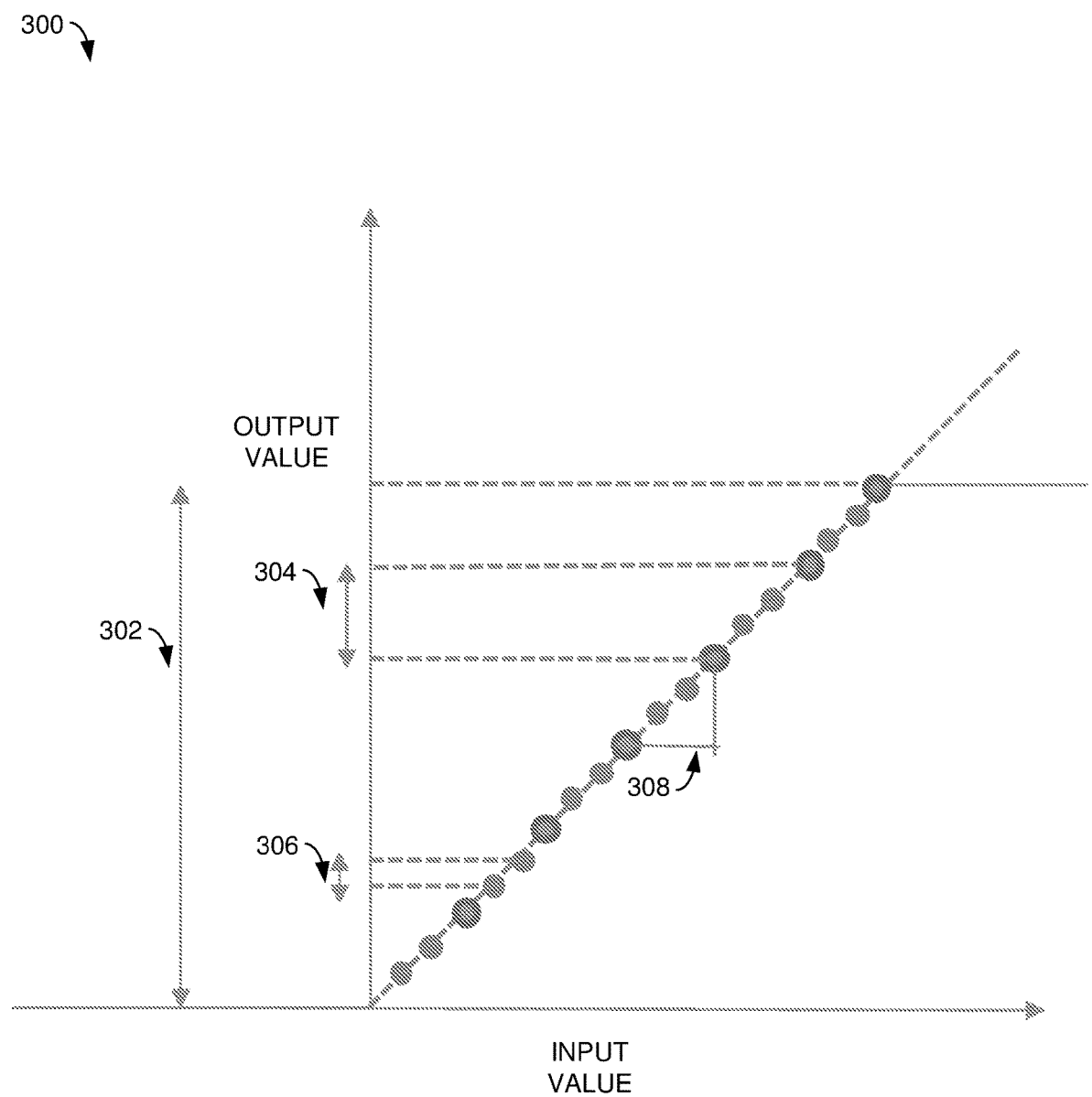
FIG. 3 illustrates an example, non-limiting graph of an output of an activation function in accordance with one or more embodiments described herein.

FIG. 3 illustrates an example, non-limiting graph 300 of an output of an activation function in accordance with one or more embodiments described herein. In some examples, the activation function described in FIG. 3 can be an activation function of the neural network of system 100 of FIG. 1. In some examples, the actions associated with graph 300 may be performed by system 100, training component 204 of system 200, or initialization component 252 system 250. Repetitive description of like elements employed in respective embodiments is omitted for sake of brevity.

There can be two data structures associated with some neural networks—the weight of the network (an amount of influence that the output of one activation function of the neural network has on the output of another activation function of the neural network), and the features of the neural network (an output of each activation function of the neural network).

In representing a data structure of a neural network, quantization can be utilized. Quantization generally is a process of constraining a set of numbers to a smaller, discrete set of numbers, such as constraining all real numbers to integers. When quantizing, two considerations can be made: (a) a range of numbers to be represented (e.g., from 0 to 100, inclusive); and (b) a resolution of the numbers that are represented (e.g., between 0 and 100, numbers are represented in increments of 0.1, so the following numbers would be represented: 0.0, 0.1, 0.2, . . . 100.0). Where each of the range and the resolution separately can be represented with a number of binary bits, then the total number of bits used to represent a set of numbers given a particular range and a particular resolution can be a sum of the number of bits used to represent the range, and a number of bits used to represent the resolution.

An activation function generally computes a dot product within a neuron of a neural network. An activation function such as ReLU can have infinite range, and infinite resolution. Efforts can be made to quantize the range and/or resolution of an activation function so as to increase efficiency, such as through an output of the activation function being calculated more quickly, or allowing the activation function to be calculated on cheaper, or less-powerful hardware.

A training process can be implemented to determine an amount of quantization for the output of an activation function. Through training, two new parameters can be introduced to a neural network (or a sub-part of a neural network, such as a layer or a neuron of the neural network). These two new parameters can be expressed as alpha, which defines the range of an output of an activation function, and beta ($\beta$), which defines a resolution of an output of an activation function. Consider an example of reducing range and resolution from infinity to a range and resolution that collectively can be expressed with four bits. Where two bits are assigned to the range, the range can cover, e.g., 0 through 3, inclusive. Then, when the other two bits of the four bits are assigned to the resolution, the resolution can be 0.25 (e.g., the combined range and resolution can cover the numbers of 0.0, 0.25, 0.50, . . . 3.0). In training, a starting point can be ReLU, where alpha and beta are infinite. Then, the training process can be used to reduce alpha and beta to a finite amount.

Graph 300, then, displays a graph of the output of an activation function, with both alpha and beta shown for the output. Two additional parameters are also shown—sub-resolution ($\lambda$) and resolution slope (1/m). Sub-resolution and resolution slope can be additional parameters used in some types of training alpha and beta. Illustrated in graph 300 are alpha 302, beta 304, sub-resolution 306, and resolution slope 308. In some examples, resolution slope 308 is defined as 1/m, where m is a parameter that is trained using a stochastic gradient descent process to approach or reach zero. Since resolution slope is here defined as 1/m, as m goes to zero, the resolution slope then approaches infinity (which is the slope in a binary activation function).

For example, in a situation where training hardware offers more processing resources than the hardware on which the neural network will eventually operate (e.g., the training hardware utilizes 64-bit processors while the neural network will eventually run on 2-bit processors), these sub-resolution and resolution slope parameters can be used to determine a quantized activation function that is more accurate than if the sub-resolution and resolution slope parameters were not utilized.

Figure 4:
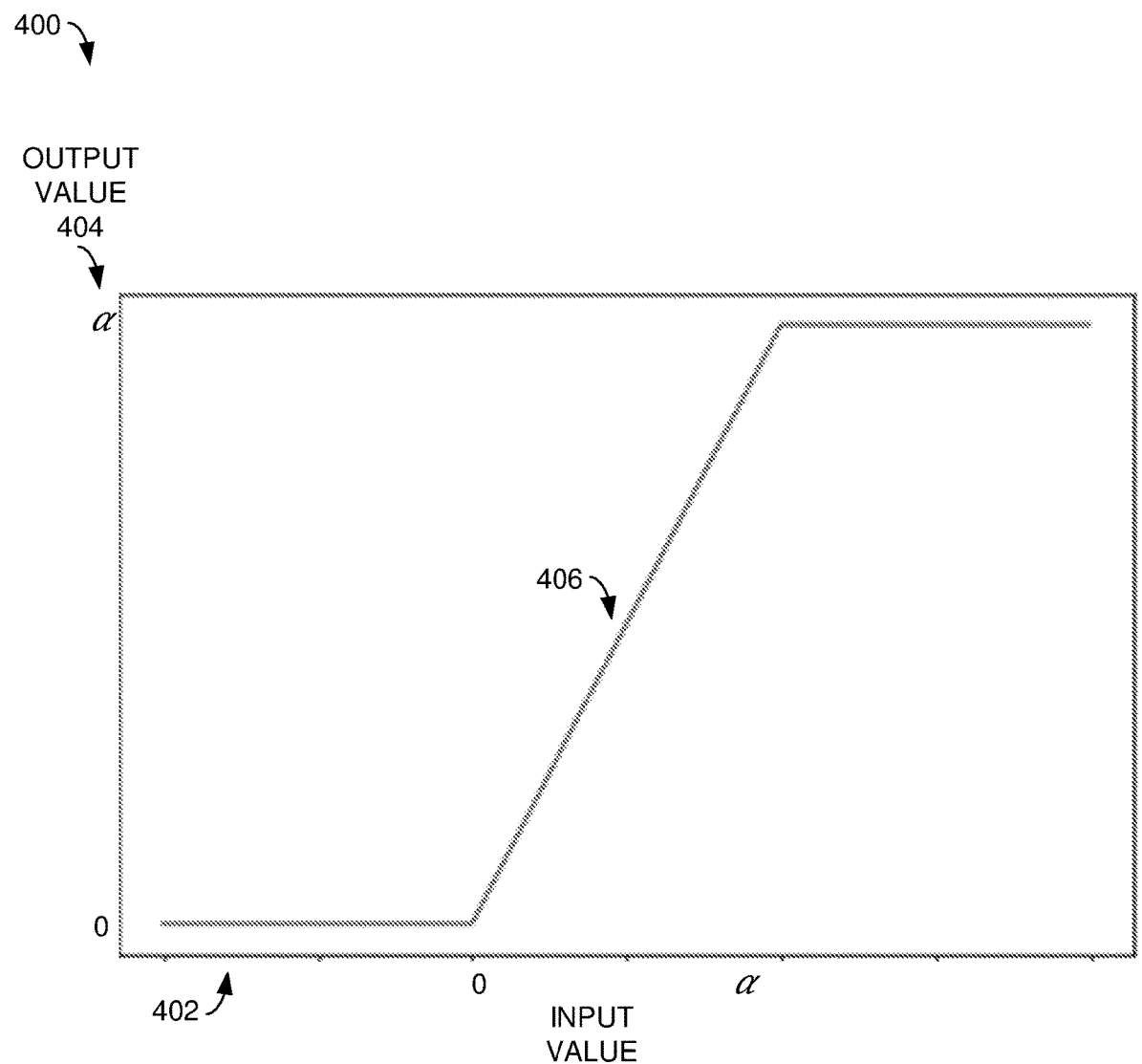
FIG. 4 illustrates another example, non-limiting graph of an output of an activation function in accordance with one or more embodiments described herein.

FIG. 4 illustrates another example, non-limiting graph 400 of an output of an activation function in accordance with one or more embodiments described herein. In some examples, the activation function described in FIG. 4 can be an activation function of the neural network of system 100 of FIG. 1. In some examples, the actions associated with graph 400 may be performed by system 100, training component 204 of system 200, or initialization component 252 system 250. Repetitive description of like elements employed in respective embodiments is omitted for sake of brevity.

As depicted, the activation function is expressed with this equation:

$$y = 0.5(|x| - |x - \alpha| + \alpha) = \begin{cases} \alpha, & x \in [\alpha, +\infty) \\ x, & x \in [0, \alpha) \\ 0, & x \in (-\infty, 0) \end{cases}$$

In the above equation, x and y represent the horizontal axis 402 and the vertical axis 404 of graph 400, respectively. Alpha represents a range of an output of the activation function. Note that, as depicted, alpha is marked on both the horizontal axis and the vertical access of graph 400. In the above equation, and as depicted in graph 400, the output 406 of the activation function y takes the value of 0 when x is less than zero, takes the value of x when x is above zero and less than alpha, and takes the value of alpha when x is at least alpha.

Then, alpha can be determined through training according to the following equation:

$$\frac{dy}{d\alpha} = \begin{cases} 1, & x \in [\alpha, +\infty) \\ 0, & \text{otherwise} \end{cases}$$

In this equation, the derivative of y with respect to alpha equals 1 where x is at least alpha, and 0 otherwise. In the process of training alpha with this equation, a stochastic gradient descent approach can be used. As each iteration of a stochastic gradient descent is used, back propagation can be applied to the activation function, the above derivative can be calculated, and alpha can be updated accordingly for the next iteration of the stochastic gradient descent.

In a stochastic gradient descent approach, alpha can be initialized to be a large value compared to the output of an activation. For example, alpha can be initialized to a maximum value that a floating-point data type can represent. With a 32-bit floating point data type, this maximum value can be $3.4*10^{38}$. With a 64-bit floating point data type, this maximum value can be $1.7*10^{308}$. Then, using the stochastic gradient descent approach, this value for alpha will generally decrease over iterations.

In the process of training alpha, a regularizer can be employed. In some examples, an L2 regularizer can be employed, where if the loss is higher, parameters are changed more. Any other suitable regularizer can also be employed in the process of training. In addition, as a result of applying an L2 regularizer during training, clipping can be employed to alpha, where a value of alpha is limited to be no more than a predetermined threshold value.

Figure 5:
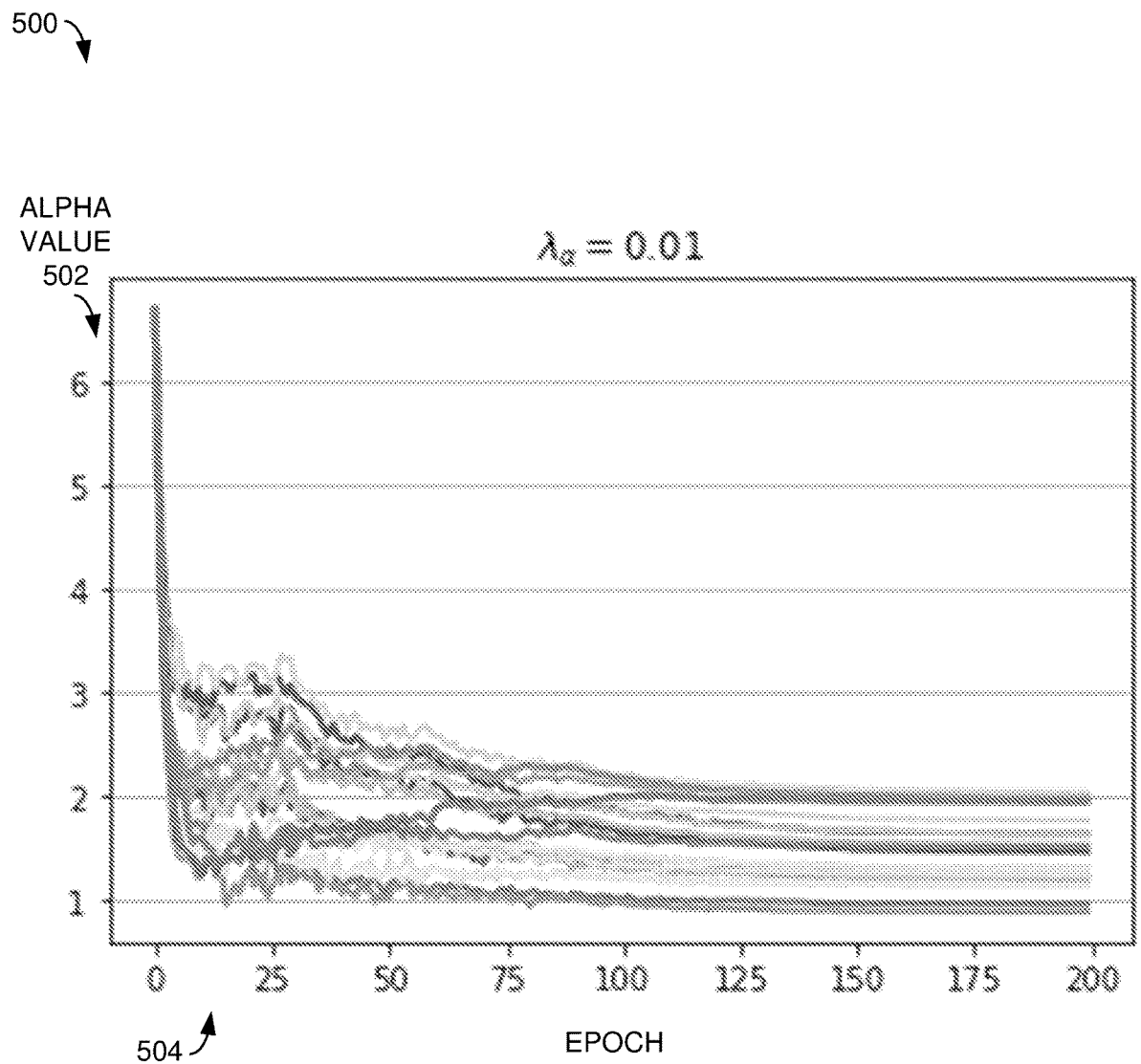
FIG. 5 illustrates a graph that plots how a range of an activation function can decrease through training in accordance with one or more embodiments described herein.

FIG. 5 illustrates a graph 500 that plots how a range of an activation function can decrease through training in accordance with one or more embodiments described herein. In some examples, the activation function described in FIG. 5 can be an activation function of the neural network of system 100 of FIG. 1. In some examples, the actions associated with graph 500 may be performed by system 100, training component 204 of system 200, or initialization component 252 system 250. Repetitive description of like elements employed in respective embodiments is omitted for sake of brevity.

In the above graph, lambda ($\lambda_\alpha$) represents an amount of regularization that is performed on alpha. In the depicted graph 500, lambda equals 0.01. In general, a larger lambda value indicates that more regularization is performed, with a lambda value of 0 indicating that no regularization is performed. A number of training epochs 504 is plotted along the x-axis of graph 500, and a corresponding alpha value 502 is plotted along the y-axis of graph 500.

Graph 500 shows how alpha decreases in a Canadian Institute for Advanced Research (CIFAR) ResNet neural network over training epochs, using the disclosed techniques. Alpha is initially set to a large value to mimic a regularizer (ReLU) activation function, and then the alpha values for different layers of the CIFAR ResNet neural network converge during training epochs. An optimal alpha to minimize a cost function is achieved through training.

Due to regularization, alpha becomes smaller in later epochs, thus performing clipping to reduce accuracy degradation that can be due to quantization.

Figure 6:
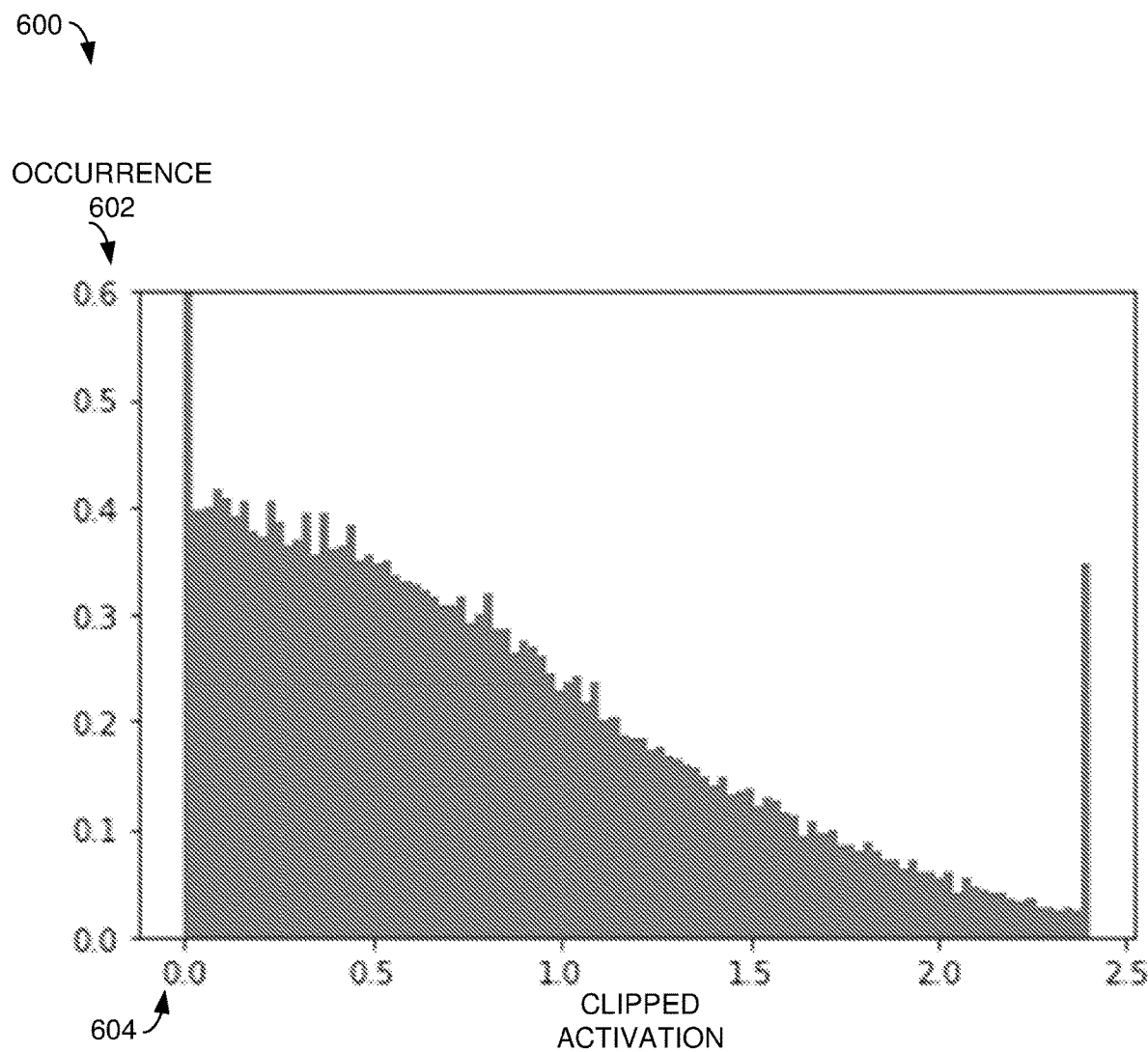
FIG. 6 illustrates a graph that plots how an activation function can be quantized in accordance with one or more embodiments described herein.

FIG. 6 illustrates a graph 600 that plots how an activation function can be quantized in accordance with one or more embodiments described herein. In some examples, the activation function described in FIG. 6 can be an activation function of the neural network of system 100 of FIG. 1. In some examples, the actions associated with graph 600 may be performed by system 100, training component 204 of system 200, or initialization component 252 system 250. Repetitive description of like elements employed in respective embodiments is omitted for sake of brevity.

As represented by graph 600, the associated quantization equation utilized is represented as $x_q = \text{round}(x/\alpha \cdot (2^b-1)) \cdot \alpha \cdot 1/(2^b-1)$. In this equation, $x_q$ represents a calculated amount of quantization, b represents a number of bits used for the given amount of quantization (in the example of graph 600, b=2), and round( ) represents a function that rounds its input to a nearest integer. After going through parameterized clipping, values are constrained to be between 0 and alpha. The output values of the associated quantization equation are plotted on graph 600 where occurrence 602 is plotted along the y-axis, and where clipped activation 604 is plotted along the x-axis.

Figure 7A:
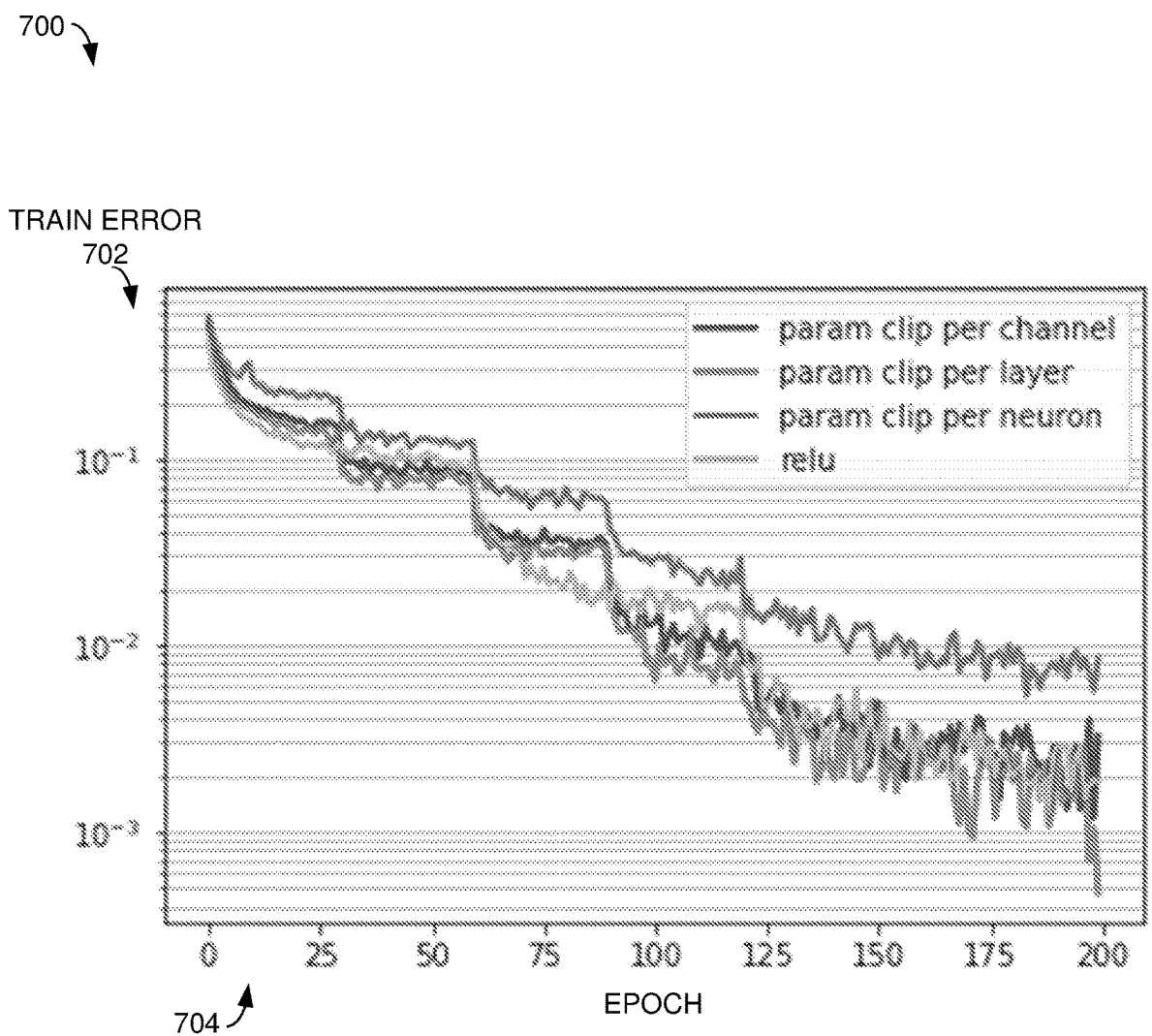
FIG. 7A illustrates a graph that shows how varying a range of activation functions within a neural network affects an error rate of the neural network in accordance with one or more embodiments described herein.

FIG. 7A illustrates a graph 700 that shows how varying a range of activation functions within a neural network affects an error rate of the neural network in accordance with one or more embodiments described herein. In some examples, the activation function described in FIG. 7A can be an activation function of the neural network of system 100 of FIG. 1. In some examples, the actions associated with graph 700 may be performed by system 100, training component 204 of system 200, or initialization component 252 system 250. Repetitive description of like elements employed in respective embodiments is omitted for sake of brevity.

In graph 700, training error 702 is plotted along the y-axis, and epoch 704 is plotted along the x-axis. Graph 700 is based on a CIFAR ResNet neural network. An amount of training error at each training epoch is graphed for each of four different types of alpha sharing—ReLU (which omits alpha altogether), parameter clipping per neuron (e.g., each neuron of a neural network has its own alpha value), parameter clipping per layer, and parameter clipping per channel. Alpha is initialized to 1.0, and no regularization for alpha is performed in this example. As can be seen in graph 700, using a parameter clipping per layer produces the lowest training error in this study.

Figure 7B:
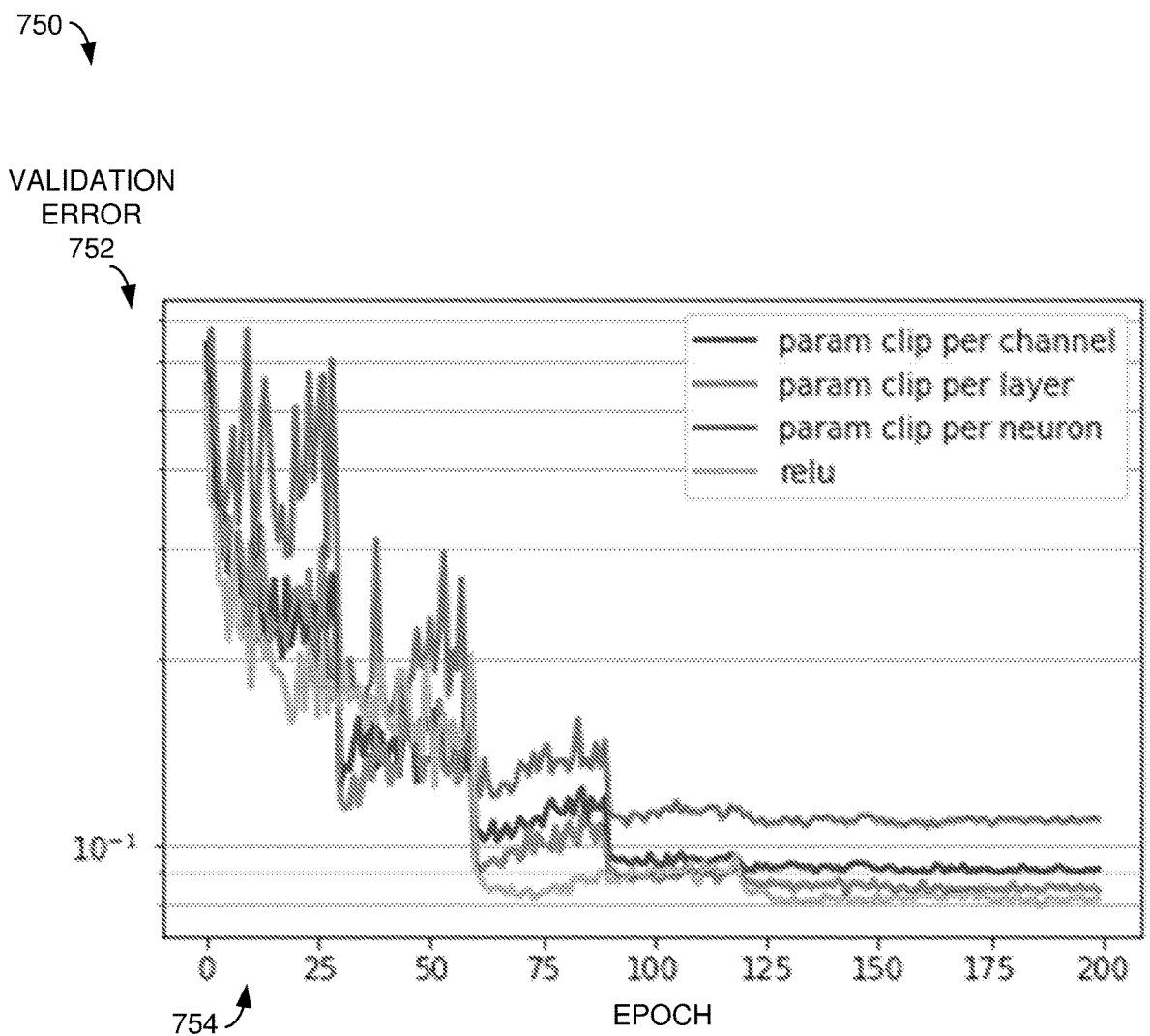
FIG. 7B illustrates another graph that shows how varying a range of activation functions within a neural network affects an error rate of the neural network in accordance with one or more embodiments described herein.

FIG. 7B illustrates another graph 750 that shows how varying a range of activation functions within a neural network affects an error rate of the neural network in accordance with one or more embodiments described herein. In some examples, the activation function described in FIG. 7B can be an activation function of the neural network of system 100 of FIG. 1. In some examples, the actions associated with graph 750 may be performed by system 100, training component 204 of system 200, or initialization component 252 system 250. Repetitive description of like elements employed in respective embodiments is omitted for sake of brevity.

In graph 750, validation error 752 is plotted along the y-axis, and epoch 754 is plotted along the x-axis. As with graph 700 of FIG. 7A, graph 750 is based on a CIFAR ResNet neural network. Whereas graph 700 shows an amount of training error at each training epoch, graph 750 shows an amount of validation error at each training epoch for each of four different types of alpha sharing—ReLU (which omits alpha altogether), parameter clipping per neuron (e.g., each neuron of a neural network has its own alpha value), parameter clipping per layer, and parameter clipping per channel. As with graph 700, alpha is initialized to 1.0, and no regularization for alpha is performed in this example. As can be seen in graph 750, ReLU produces the lowest validation error for this study, followed by using a parameter clipping per layer.

Figure 8:
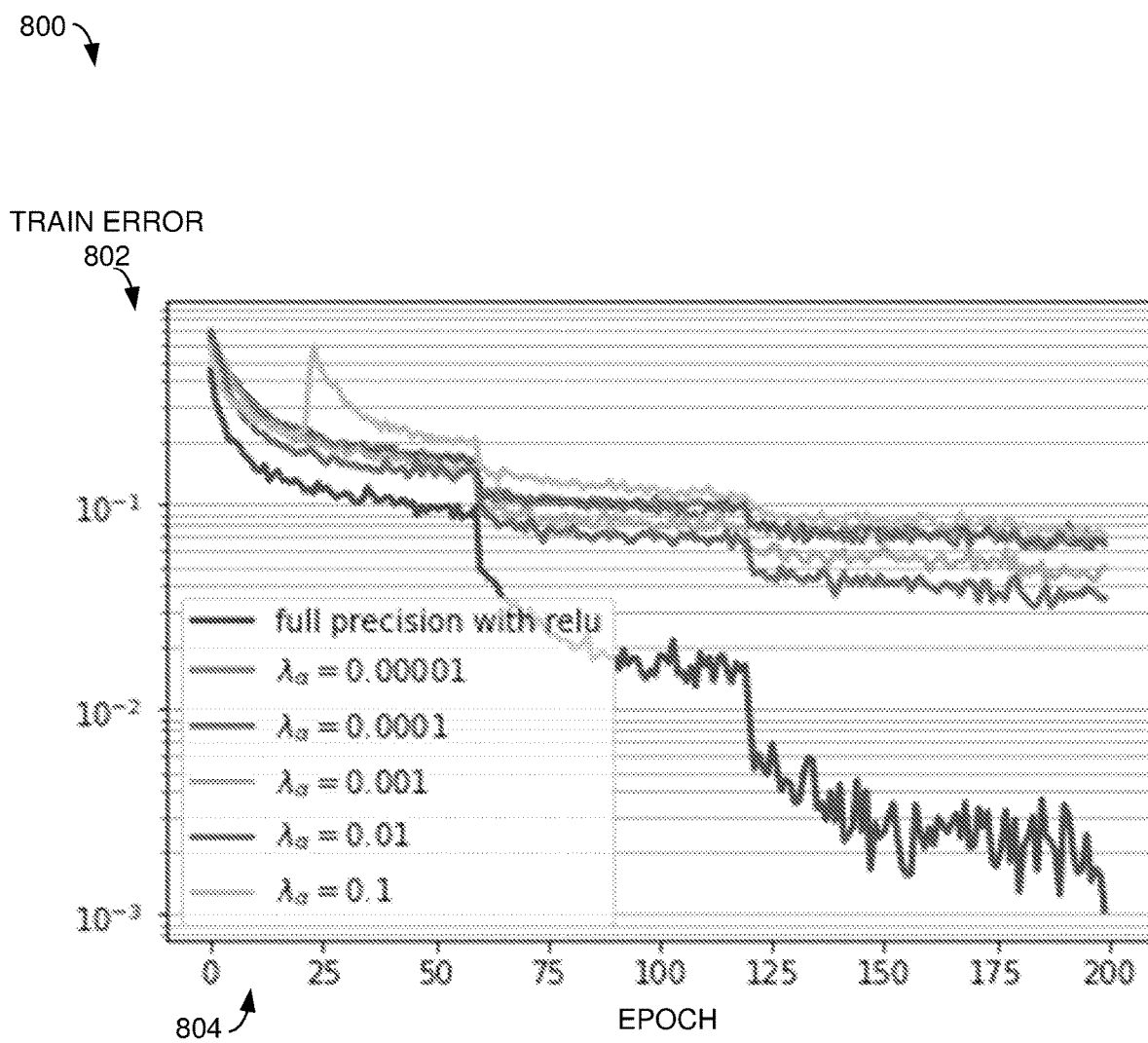
FIG. 8 illustrates a graph that shows how using different regularizers while varying a range of an activation function within a neural network affects an error rate of the neural network in accordance with one or more embodiments described herein.

FIG. 8 illustrates a graph 800 that shows how using different regularizers while varying a range of an activation function within a neural network affects an error rate of the neural network in accordance with one or more embodiments described herein. In some examples, the activation function described in FIG. 8 can be an activation function of the neural network of system 100 of FIG. 1. In some examples, the actions associated with graph 800 may be performed by system 100, training component 204 of system 200, or initialization component 252 system 250. Repetitive description of like elements employed in respective embodiments is omitted for sake of brevity.

In graph 800, training error 802 is plotted along the y-axis, and epoch 804 is plotted along the x-axis. In graph 800, lambda$_{alpha}$ represents the amount of regularization used in each training epoch, with lambda$_{alpha}$ being set to 0 indicating that no regularization is used. As seen in graph 800, the present techniques for determining an appropriate alpha work robustly across a wide range of lambda values. As depicted, lambda$_{alpha}$ values between 0.00001 and 0.1 produce roughly similar training errors for a given training epoch. Graph 800 shows train error for various training epochs using a CIFAR ResNet activation function.

Figure 9:
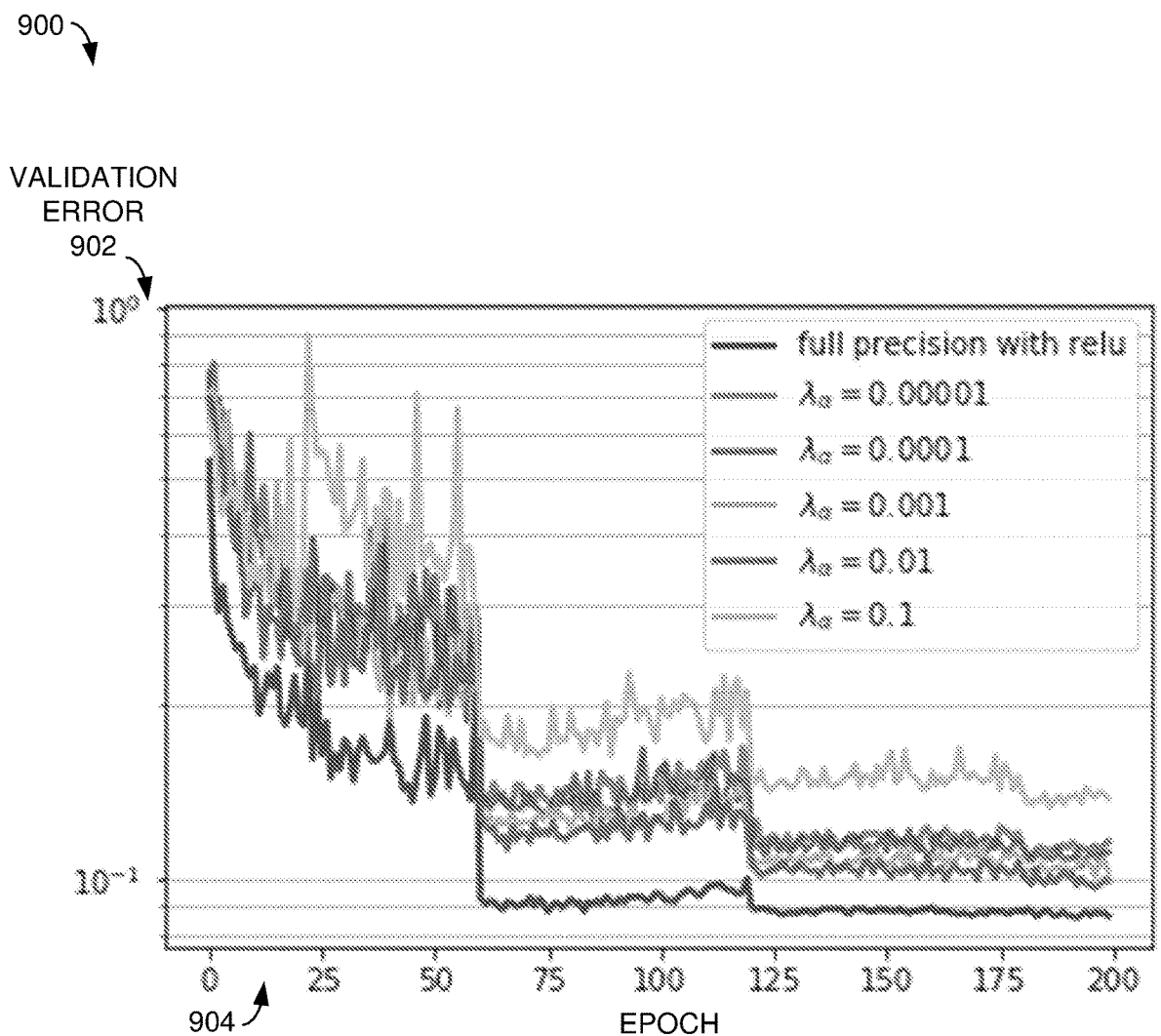
FIG. 9 illustrates another graph that shows how using s of the neural network in accordance with one or more embodiments described herein.

FIG. 9 illustrates another graph 900 that shows how using different regularizers while varying a range of an activation function within a neural network affects an error rate of the neural network in accordance with one or more embodiments described herein. In some examples, the activation function described in FIG. 9 can be an activation function of the neural network of system 100 of FIG. 1. In some examples, the actions associated with graph 900 may be performed by system 100, training component 204 of system 200, or initialization component 252 system 250. Repetitive description of like elements employed in respective embodiments is omitted for sake of brevity.

In graph 900, validation error 902 is plotted along the y-axis, and epoch 904 is plotted along the x-axis. Additionally, in graph 900, a variety of regularization values are applied for an activation function, as well as a graph of full precision with ReLU. Generally, a larger alpha gives lower validation error.

Figure 10:
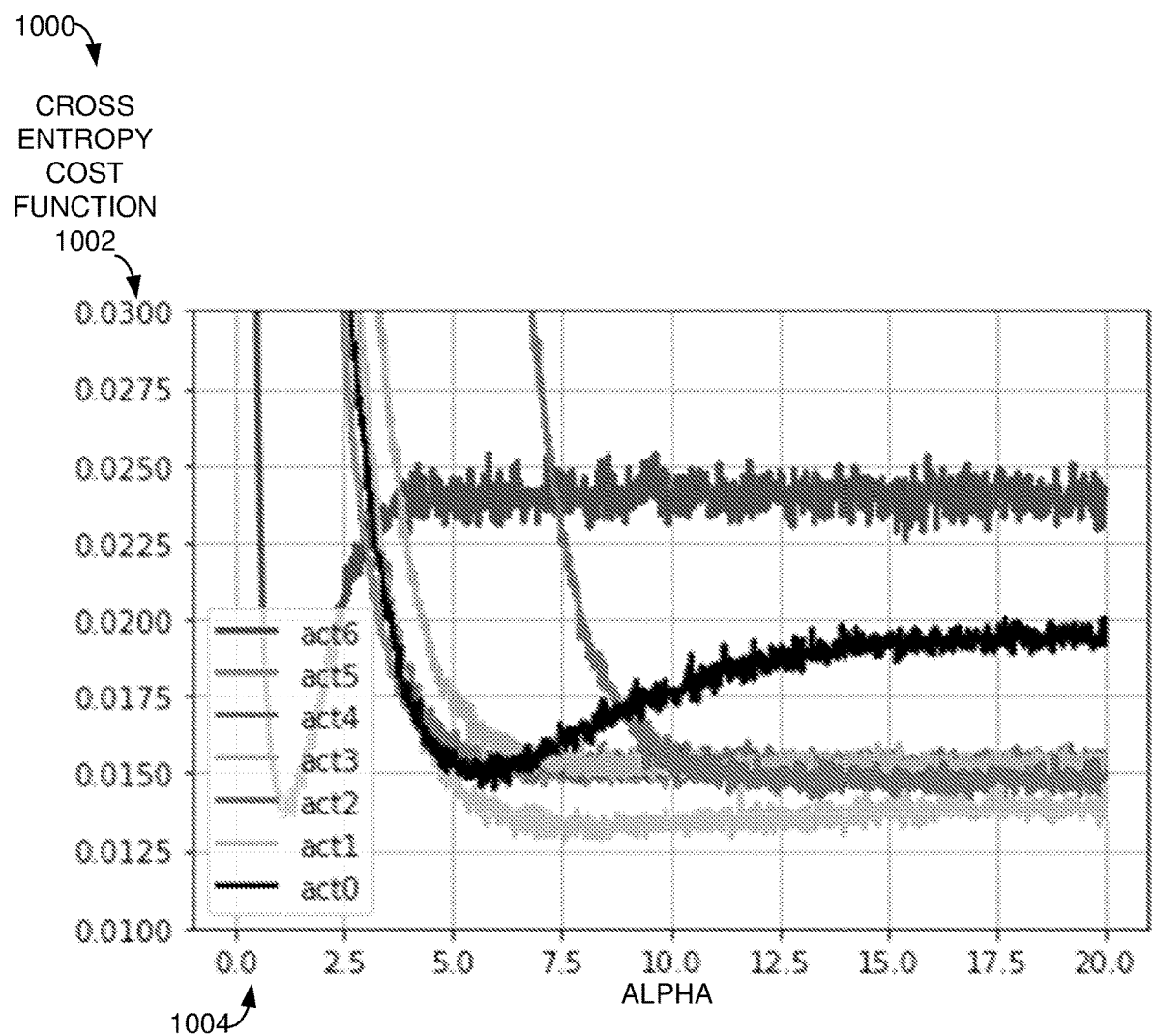
FIG. 10 illustrates a graph that shows how varying a range of an activation function within a neural network affects an associated cross-entropy cost function in accordance with one or more embodiments described herein.

FIG. 10 illustrates a graph 1000 that shows how varying a range of an activation function within a neural network affects an associated cross-entropy cost function in accordance with one or more embodiments described herein. In some examples, the activation function described in FIG. 10 can be an activation function of the neural network of system 100 of FIG. 1. In some examples, the actions associated with graph 1000 may be performed by system 100, training component 204 of system 200, or initialization component 252 system 250. Repetitive description of like elements employed in respective embodiments is omitted for sake of brevity.

FIG. 10 (and FIG. 11 and FIG. 12) can be used to illustrate what occurs when alpha is trained. To illustrate how the disclosed subject matter of increasing an efficiency of a neural network can operate, training loss (a combination of cross entropy loss and total loss including regularization) against alpha can be plotted for a Street View House Numbers (SVHN) dataset. For graph 1000 (as well as graph 1100 and graph 1200), a trained model with a given quantization scheme, and then sweet alpha of one particular layer of a neural network while fixing other variables (such as weight, a number of bits used, and beta) to compute a loss function. Here in graph 1000, the loss function is computed for full precision versus alpha.

In graph 1000, cross entropy cost function 1002 is plotted along the y-axis, and alpha 1004 is plotted along the x-axis. As shown in graph 1000, in the case of full precision, cross entropy loss converges to a relatively small value as alpha increases. This convergence of cross entropy loss to a relatively small value as alpha increases indicates that ReLU can be utilized with a relatively small amount of cross entropy loss where no quantization is employed. Additionally, where full precision is used, training clipping scale alpha can help rude training costs of some layers of a neural network (shown here in graph 1000 as act0 and act6).

Figure 11:
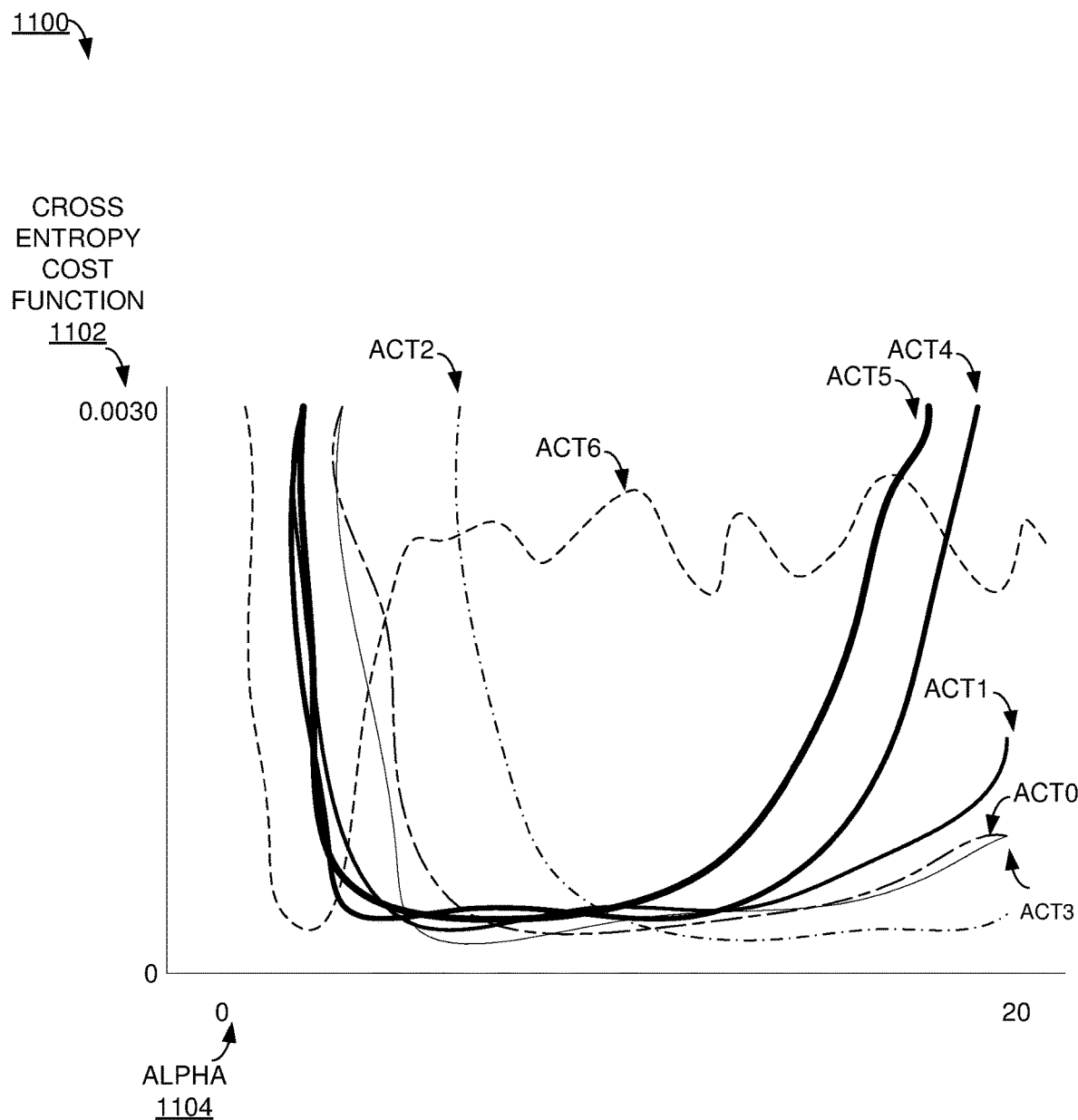
FIG. 11 illustrates a graph that shows how varying a range of an activation function within a neural network affects an associated cross-entropy cost function, where the range and one or more inputs to the activation function are quantized, in accordance with one or more embodiments described herein.

FIG. 11 illustrates a graph 1100 that shows how varying a range of an activation function within a neural network affects an associated cross-entropy cost function, where the range and one or more inputs to the activation function are quantized, in accordance with one or more embodiments described herein. In some examples, the activation function described in FIG. 11 can be an activation function of the neural network of system 100 of FIG. 1. In some examples, the actions associated with graph 1100 may be performed by system 100, training component 204 of system 200, or initialization component 252 system 250. Repetitive description of like elements employed in respective embodiments is omitted for sake of brevity.

In graph 1100, cross entropy cost function 1102 is plotted along the y-axis, and alpha 1104 is plotted along the x-axis. Graph 1100 shows a cross entropy loss computed when both weight and alpha are quantized. As can be seen in graph 1100, with quantization, as alpha increases, loss function also increases, which can indicate that an approach other than ReLU is to be used in the associated neural network. As also can be seen in graph 1100, for different layers, an alpha value that offers a minimized cross entropy cost function differs. So, training can be utilized to identify these different alpha values for different layers.

Additionally, a plateau exists for certain ranges of alpha (e.g., an alpha value above approximately 8.75 for the act2 layer, above which the associated cross entropy loss function is roughly static). These plateaus for certain ranges of alpha can impede the use of gradient descent learning. The graph of the act6 layer shown in graph 1100 can present more challenges for utilizing gradient descent learning than the other layers shown in graph 1100.

Figure 12:
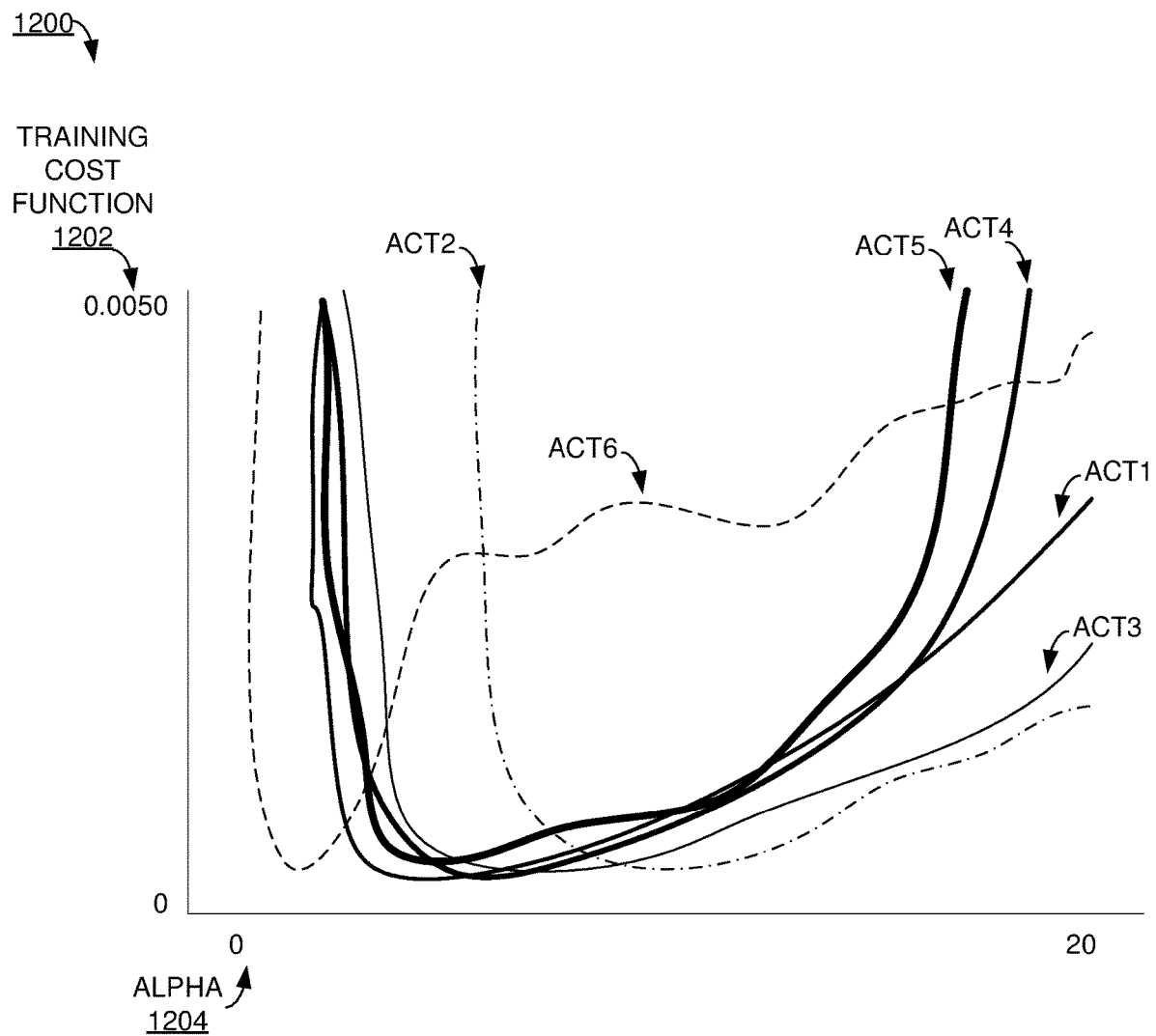
FIG. 12 illustrates a graph that shows how regularizing a range of an activation function within a neural network during training affects an associated training cost function in accordance with one or more embodiments described herein.

FIG. 12 illustrates a graph 1200 that shows how regularizing a range of an activation function within a neural network during training affects an associated training cost function in accordance with one or more embodiments described herein. In some examples, the activation function described in FIG. 12 can be an activation function of the neural network of system 100 of FIG. 1. In some examples, the actions associated with graph 1200 may be performed by system 100, training component 204 of system 200, or initialization component 252 system 250. Repetitive description of like elements employed in respective embodiments is omitted for sake of brevity.

In contrast with graph 1100 of FIG. 11, in graph 1200 indicates how regularization can be utilized to minimize total loss function (computer when weight and activation are quantized). In graph 1200, training cost function 1202 is plotted along the y-axis, and alpha is plotted along the x-axis. As can be seen in graph 1200, regularization reduces plateau effects, which facilitates use of gradient descent learning in terms of faster and more-accurate convergence on a value. As shown in graph 1200, a regularizer can be selected to both mitigate the effect of a plateau, while also not significantly perturbing a global minimal point.

The solid circles associated with each line of graph 1200 indicate a value for alpha that is extracted from the training model, which indicates that training is effective in these cases. Put another way, to compare the curves of graph 1200 and graph 1100, one can see how a stochastic gradient descent approach can be utilized on graph 1200 because there is a gradient. That is, each line graphed in graph 1200 can be considered to have a distinct point whose value is easy for a stochastic gradient descent approach to determine. A value being easy for a stochastic gradient descent approach to determine can mean that fewer processing resources can be utilized to determine this distinct point than would otherwise be utilized.

The three graphs of FIGS. 10-12—graph 1000, graph 1100, and graph 1200, respectively—can be compared and contrasted as follows. Graph 1000 generally shows that, without full precision, a larger alpha gives lower loss. Graph 1100 then introduces quantization, and shows that, as quantization is applied, the shape of the curves that are graphed changed. In graph 1100, a larger alpha gives a higher loss, so choosing an alpha value that minimizes loss can be found in the middle of a curve, rather than at an extreme. Graph 1200 then introduces regularization and the shape of the curves that are graphed change again. Each curve generally has a single minimum value. Through regularization, an alpha value can be more easily determined when utilizing a stochastic gradient descent approach.

Figure 13:
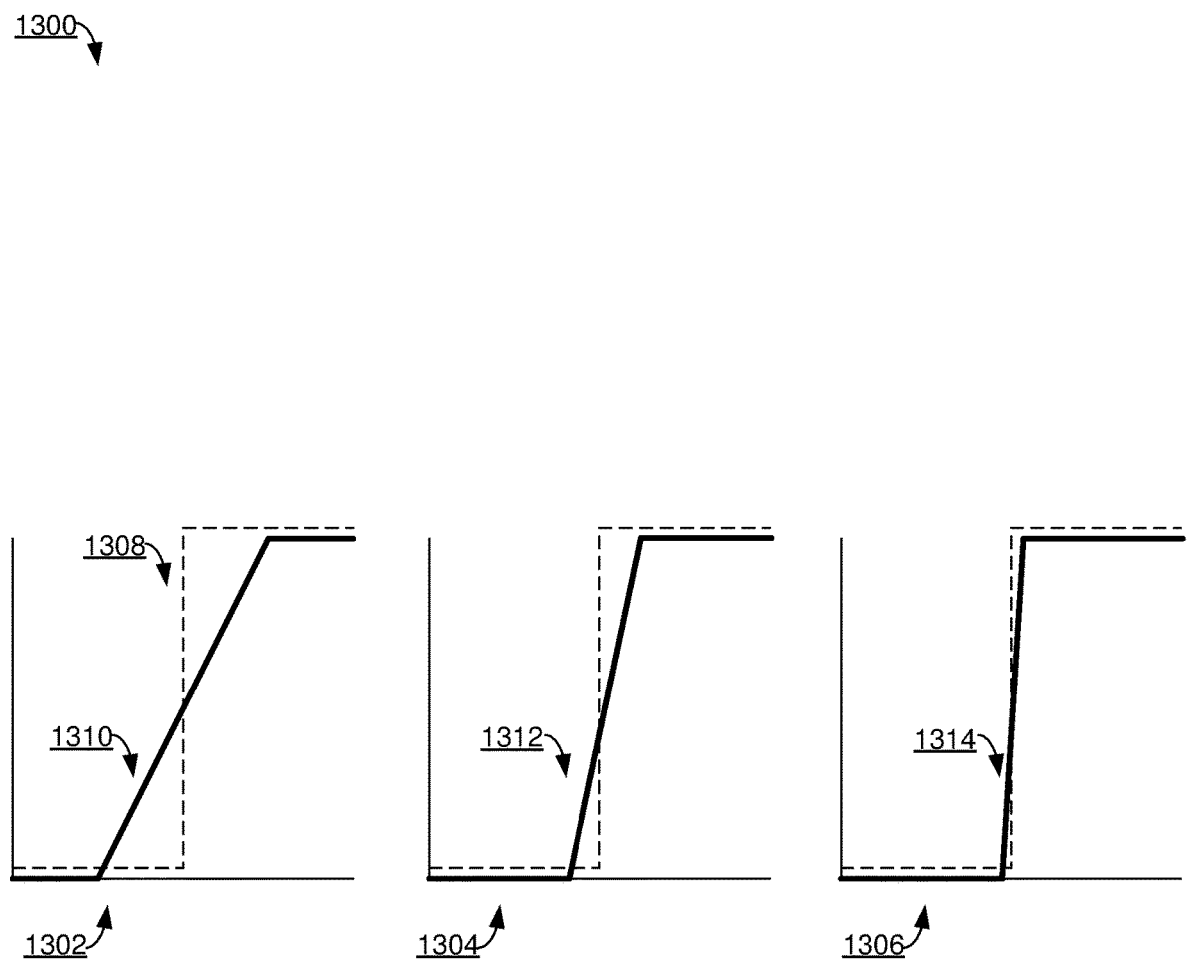
FIG. 13 illustrates three graphs that shows how a clipping activation function of a neural network can be trained to become a binary activation function in accordance with one or more embodiments described herein.

FIG. 13 illustrates three graphs 1300 that shows how a clipping activation function of a neural network can be trained to become a binary activation function in accordance with one or more embodiments described herein. In some examples, the activation function described in FIG. 13 can be an activation function of the neural network of system 100 of FIG. 1. In some examples, the actions associated with graph 1300 may be performed by system 100, training component 204 of system 200, or initialization component 252 system 250. Repetitive description of like elements employed in respective embodiments is omitted for sake of brevity.

As depicted in FIG. 13, in addition to alpha and beta parameters, sub-resolution and sub-resolution slope parameters (as described with respect to FIG. 2, above) are utilized. In general, the slope of the output of an activation function is changed from a flatter slope to a more vertical slope, to a yet more vertical slope. As the slope becomes more vertical, the output of the associated activation function approaches the output of a binarized activation function (i.e., an activation function that has two possible values that it can output). As the output of the associated activation function sufficiently approaches the output of a binarized activation function, the activation function can be replaced with a corresponding binarized activation function to quantize the output with relatively little loss in activation function accuracy.

As depicted, an activation function can be expressed as: actFn(x)=Clip(x/m+$\alpha$/2,0,$\alpha$), where actFn( ) refers to an activation function, Clip( ) refers to a clipping function, and m is the slope of the activation (with a smaller m value indicating a steeper slope). Through repeated training epochs, the clipping activation function approaches binarization. That is, as m decreases through repeated training epochs, the stope becomes steeper, and the activation function approaches a binarization function.

The three graphs 1300 are made up of graph 1302, graph 1304, and graph 1304. These three graphs 1300 show three points in a training process, occurring in order of time as graph 1302, then graph 1304, then graph 1306. In graph 1302, a trained activation function 1308 and a binarized activation function 1310 are shown. In graph 1304, trained activation function 1312 is shown, which is a later point in training than trained activation function 1308. In graph 1306, trained activation function 1314 is shown, which is a later point in training than trained activation function 1312. Note that the value of m decreases from trained activation function 1308 to trained activation function 1312 to trained activation function 1314, as the slope of these graphed functions steepens and approaches a vertical slope as shown with binarized activation function 1310.

Figure 14:
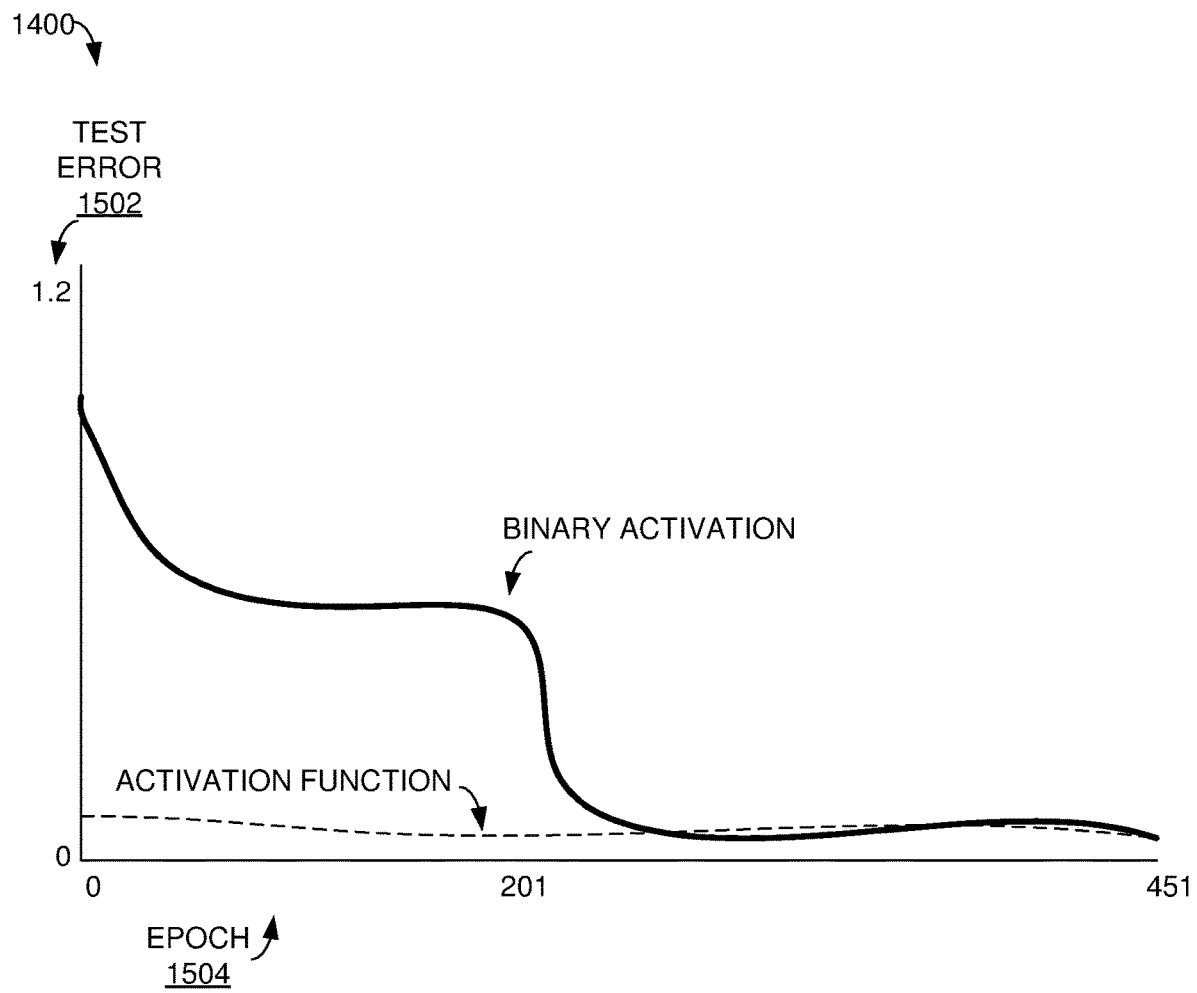
FIG. 14 illustrates a graph that shows how a binary activation function of a neural network compares to an activation function, in terms of test error, in accordance with one or more embodiments described herein.

FIG. 14 illustrates a graph 1400 that shows how a binary activation function of a neural network compares to an activation function, in terms of test error, in accordance with one or more embodiments described herein. In some examples, the activation function described in FIG. 14 can be an activation function of the neural network of system 100 of FIG. 1. In some examples, the actions associated with graph 1400 may be performed by system 100, training component 204 of system 200, or initialization component 252 system 250. Repetitive description of like elements employed in respective embodiments is omitted for sake of brevity.

In graph 1400, test error 1402 is plotted along the y-axis, and epoch is plotted along the x-axis. In FIG. 14, test error for training epochs is plotted for two types of neural networks—(a) a Mixed National Institute of Standards and Technology Deep Neural Network (MNIST-DNN) neural network that utilizes a full-resolution activation function; and (2) a MNIST-DNN neural network that utilizes a binary activation function. Graph 1400 shows that after a sufficient number of training epochs (i.e. approximately 250 training epochs), the test error is nearly identical for both the MNIST-DNN neural network that utilizes a full-resolution activation function and the MNIST-DNN neural network that utilizes a binary activation function.

Specifically, these two types of neural networks are implemented as Multilayer Perception (MLP) MNIST neural network, with an architecture of 784—2048—2048—2048—10 neurons. L2 regularization is used with $\lambda$=1 for all three layers. The first layer is trained for 200 epochs, the next two layers are trained for 100 epochs, and then the outer layer is trained for 100 epochs.

Figure 15:
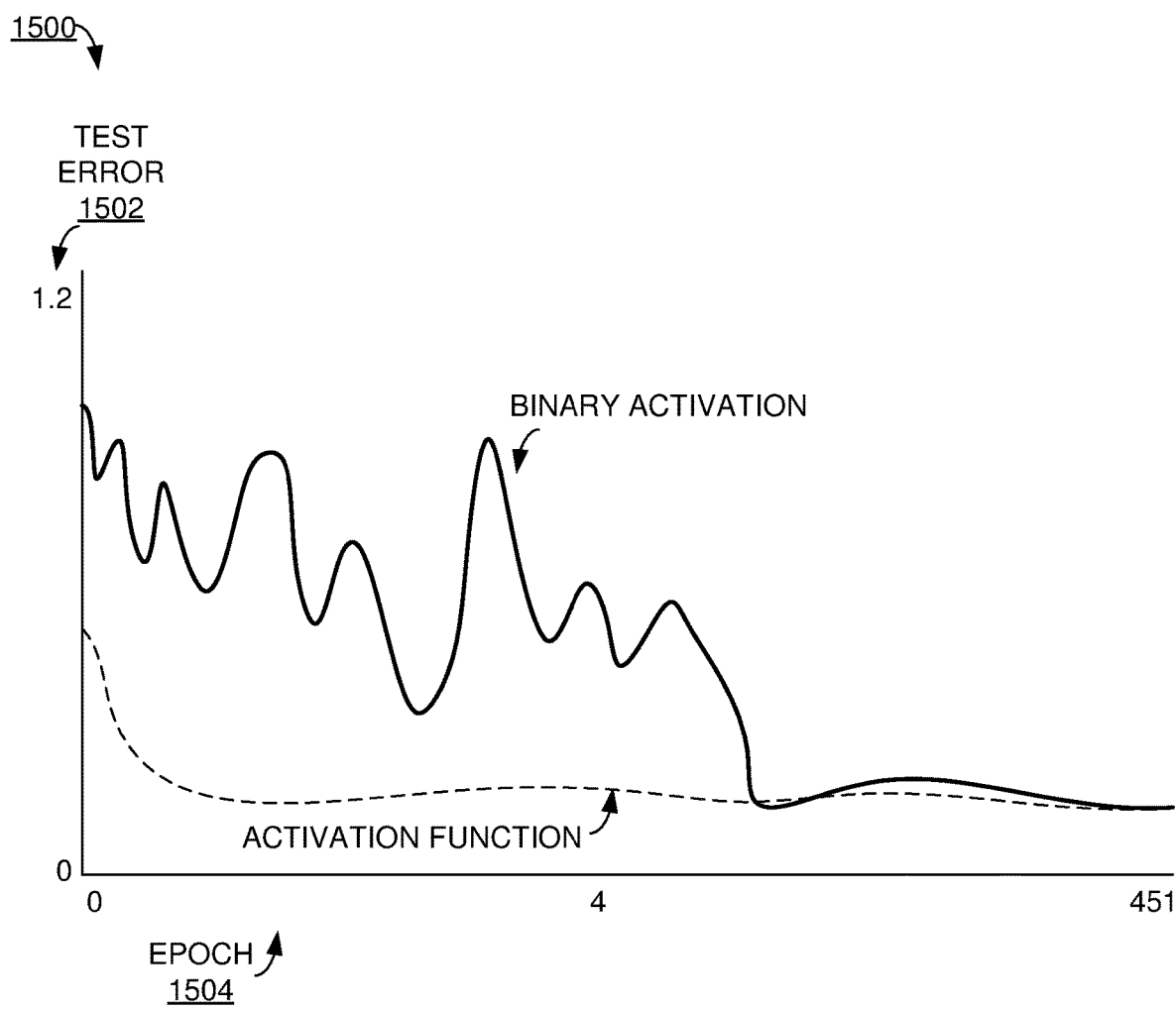
FIG. 15 illustrates another graph that shows how a binary activation function of a neural network compares to an activation function, in terms of test error, in accordance with one or more embodiments described herein.

FIG. 15 illustrates another graph 1500 that shows how a binary activation function of a neural network compares to an activation function, in terms of test error, in accordance with one or more embodiments described herein. In some examples, the activation function described in FIG. 15 can be an activation function of the neural network of system 100 of FIG. 1. In some examples, the actions associated with graph 1500 may be performed by system 100, training component 204 of system 200, or initialization component 252 system 250. Repetitive description of like elements employed in respective embodiments is omitted for sake of brevity.

In graph 1500, test error 1502 is plotted along the y-axis, and epoch 1504 is plotted along the x-axis. Similar to in FIG. 14, in FIG. 15, test error for training epochs is plotted for two types of neural networks—(a) a MNIST-DNN neural network that utilizes a full-resolution activation function; and (2) a MNIST-DNN neural network that utilizes a binary activation function. Graph 1500 shows that after a sufficient number of training epochs (i.e. approximately 300 training epochs), the test error is nearly identical for both the MNIST-DNN neural network that utilizes a full-resolution activation function and the MNIST-DNN neural network that utilizes a binary activation function.

Specifically, these two types of neural networks are implemented as CIFAR Visual Geometry Group (VGG) neural network, with an architecture of 128C3—128C3—MP2—256C3—256C3—MP2—512C3—512C3—MP2—1024FC—1024FC—10 neurons. Both L2 and L1 regularization re used with $\Delta_{type1}=0.1$; $\lambda_{type2}=0.01$; and $\lambda_{type3}=0.001$ for the respective layers. Each layer is trained for 50 epochs.

FIG. 16 illustrates a graph that shows how a compression rate of a range of an activation function corresponds to an associated test error, in accordance with one or more embodiments described herein. In some examples, the activation function described in FIG. 16 can be an activation function of the neural network of system 100 of FIG. 1. In some examples, the actions associated with graph 1600 may be performed by system 100, training component 204 of system 200, or initialization component 252 system 250. Repetitive description of like elements employed in respective embodiments is omitted for sake of brevity.

In graph 1600, test error 1602 (corresponding to graphed line 1610) and compression ratio 1604 (corresponding to graphed line 1608) are plotted along the y-axis, and number of layers compressed 1606 is plotted along the x-axis. Roughly, as more layers of a neural network are binarized, there is both a higher compression rate, and a higher accuracy loss. As depicted, binarizing 4 layers can serve as a balance between compression rate and test error, with a compression rate of approximately 77.2% and a test error of approximately 9.28%.

The individual characteristics of each neural network can affect where an appropriate amount of binarization of layers is found. In general, an amount of binarization of layers can be chosen where both a compression rate is relatively high, and a test error is relatively low.

FIG. 17 illustrates a flow diagram of an example, non-limiting computer-implemented method that facilitates improving an efficiency of a neural network in accordance with one or more embodiments described herein. Repetitive description of like elements employed in other embodiments described herein is omitted for sake of brevity. Repetitive description of like elements employed in respective embodiments is omitted for sake of brevity.

At 1702, a device operatively coupled to a processor (e.g., the neural network of system 100, or initialization component 202) can select an initial value of an output limit, wherein the output limit indicates a range for an output of an activation function of a neural network. For example, the device can determine an initial value for the output limit, which can be alpha as described elsewhere, which is to be trained to determine a value of alpha to use for an activation function of a neural network. In some embodiments, the initial value of alpha can be selected as a relatively large value, such as the maximum value of a 32-bit or 64-bit floating point data type.

At 1704 the device (e.g., the neural network of system 100, or training component) can modify the initial value of the output limit during training to a second value of the output limit, the second value of the output limit being provided as a parameter to the activation function. For example, multiple training epochs can be run with a stochastic gradient descent approach to determine a value of alpha to use that balances reducing precision with mitigating an error rate that results from a reduced precision.

In some embodiments, operation 1704 can be implemented by a training component. The training component can utilize a greater precision than a precision of the activation function component. For example, training the neural network can occur on hardware with 32-bit processors, and then the trained neural network can operate on hardware with 2-bit processors. In some embodiments, the training component can utilize a resolution parameter that has a greater precision than the precision component, and wherein the training component utilizes a resolution slope parameter that indicates a slope within a sub-resolution range. This sub-resolution parameter and resolution slope parameter are described in more detail in the description of graph 300 of FIG. 3 (where they are referred to as sub-resolution and resolution slope, respectively).

In some embodiments, the training component increases a value of the resolution slope parameter toward infinity during training. Increasing a value of the resolution slope parameter toward infinity during training can be performed in a similar manner as illustrated by graph 300 of FIG. 3.

In some embodiments, clipping is performed during training with the training component to reduce accuracy degradation due to quantization. Examples of performing clipping during training are found in at least graph 400 of FIG. 4, graph 500 of FIG. 5, and graph 1300 of FIG. 13.

In some embodiments, back propagation is performed during training with the training component. Back propagation generally is used to calculate an error contribution of one or more neurons in a neural network after a training epoch is performed. Based on back propagation, a weight of one or more neurons can be adjusted for the next training epoch. Back propagation can be used in conjunction with a gradient descent approach, where back propagation can be used to determine a gradient of a loss function.

In some embodiments, the training component can include an activation function selection component that determines to use a rectifier linear unit as the activation function in a case of full precision, wherein cross entropy loss converges as the output limit increases. With reference to graph 1000 of FIG. 10, in some situations where full precision is utilized, cross entropy loss can converge to a small value as alpha increases. This convergence of cross entropy loss to a small value can indicate that ReLU can be used as an activation function to increase efficiency in a neural network where quantization is not employed.

In some embodiments, the training component can include an activation function selection component that determines that, as the output limit increases, a loss function also increases with quantization, and determines to use an activation function type of the activation function that is other than a rectifier linear unit. With reference to graph 1100 of FIG. 11, with quantization, as alpha increases, a corresponding loss function can also increase, indicating that an activation function other than ReLU can be employed to increase efficiency in a neural network.

At 1706 the device (e.g., the neural network of system 100, or activation function component 206) can determine the output of the activation function based on using the second value of the output limit as the parameter. For example, once a neural network has been trained to determine one or more alpha values to be used with one or more activation functions, this trained neural network can then be operated with these alpha value(s), so that the neural network can operate with less precision, and therefore operate more efficiently.

FIG. 18 illustrates a flow diagram of another example, non-limiting computer-implemented method that facilitates improving an efficiency of a neural network in accordance with one or more embodiments described herein. Repetitive description of like elements employed in other embodiments described herein is omitted for sake of brevity. Repetitive description of like elements employed in respective embodiments is omitted for sake of brevity.

At 1802, a device (e.g., the neural network of system 100, or initialization component 252) operatively coupled to a processor can initialize a value for an output limit, wherein the output limit comprises a range for an output of an activation function of a neural network, the value for the output limit being determined via training. For example, a neural network can be trained to determine a value for the output limit, which can be alpha as described elsewhere, for at least one activation function of the neural network that balances a reduced precision (as indicated by that alpha value) with minimizing an error rate of the neural network. The neural network can be trained by initializing alpha with a relatively large value (such as a maximum value expressed by a 32-bit or 64-bit data type), and then implementing a stochastic gradient descent approach to determine the value of alpha to be used when operating the neural network.

In some examples, the system can apply a stochastic gradient descent approach during the training. A stochastic gradient descent approach to determining a value for alpha is described with reference to at least graph 1000 of FIG. 10, graph 1100 of FIG. 11, and graph 1200 of FIG. 12.

In some examples, the system can determine the value for the output limit based on performing the training with an initial value of the output limit. For instance, the system can initialize a value for alpha as a maximum value represented by a 32-bit or 64-bit floating point data type, and then reduce this value during training (such as via a stochastic gradient descent approach) to determine a value of alpha to be used for the corresponding activation function.

In some examples, the system can regularize the output limit during training. This regularization is described with reference to at least graph 1100 of FIG. 11 and graph 1200 of FIG. 12.

In some examples, the system can perform clipping during the training to reduce accuracy degradation due to quantization. Examples of performing clipping during training are found in at least graph 300 of FIG. 3, graph 400 of FIG. 3, and graph 1300 of FIG. 13.

In some examples, the system can employ back propagation during the training. In some examples, in the course of training, the system can determine to use a rectifier linear unit as the activation function in a case of full precision, and wherein cross entropy loss converges as the output limit increases. In some examples, in the course of training, the system can determine that as the output limit increases, a loss function also increases with quantization, and determining to use an activation function type of the activation function that is other than a rectifier linear unit. In some examples, the system can regularize the output limit during the training.

In some examples, the value of the output limit is larger than a second value of the output limit, and training comprises setting the output limit to a plurality of successive values that are smaller than the initial value of the output limit and larger than the second value of the output limit. In such examples, a stochastic gradient descent approach can be utilized in training. It can be that there are some intermediary values between the value of the output limit and the second value of the output limit, and these intermediary values decrease during training from the output limit to the second output limit. For example, where the output limit is 10 and the second output limit is 2, there can be intermediary values of 9, 6, and 4. In some examples, there can also be an intermediary value that is larger than the preceding intermediary value, though the trend of the intermediary values is to decrease through training.

In some examples, the system can determine that as the output limit increases, a loss function also increases with quantization, and determine to use an activation function type of the activation function that is other than a rectifier linear unit. In some examples, the system can perform clipping during the training to reduce accuracy degradation due to quantization.

At 1804, the device (e.g., the neural network of system 100, or activation function component 254) can determine the output of the activation function given the value of the output limit as a parameter to the activation function. For example, a value of the output limit can indicate that the corresponding activation function is limited to outputting a result that varies between 0 and 1, inclusive. So, when the activation function is run to determine an output for the activation function, this output of the activation function can be limited to between 1 and 1, inclusive, as indicated by the output limit.

In some examples, the activation function is expressed with equations comprising:

$$y = 0.5(|x| - |x - \alpha| + \alpha) = \begin{cases} \alpha, & x \in [\alpha, +\infty) \\ x, & x \in [0, \alpha) \\ 0, & x \in (-\infty, 0) \end{cases}$$

and $$\frac{dy}{d\alpha} = \begin{cases} 1, & x \in [\alpha, +\infty) \\ 0, & \text{otherwise} \end{cases}.$$

In the above equations, x and y represent the horizontal axis and the vertical axis of an associated graph, respectively. The alpha variable represents a range of an output of the activation function. For the second graph, the derivative of y with respect to alpha equals 1 where x is at least alpha, and 0 otherwise.

In some examples, the output of the activation function ranges between zero and the output limit, inclusive, and the output of the activation function is a linear function based on the output of the activation function being between zero and the output limit. Such examples are shown with respect to at least graph 300 of FIG. 3, and graph 1300 of FIG. 13.

In order to provide a context for the various aspects of the disclosed subject matter, FIG. 19 as well as the following discussion are intended to provide a general description of a suitable environment in which the various aspects of the disclosed subject matter can be implemented. FIG. 19 illustrates a block diagram of an example, non-limiting operating environment in which one or more embodiments described herein can be facilitated. Repetitive description of like elements employed in other embodiments described herein is omitted for sake of brevity.

With reference to FIG. 19, a suitable operating environment 1901 for implementing various aspects of this disclosure can also include a computer 1912. In various embodiments, system 100, and each of neurons 102-110 can be or include one or more components, features and functionalities of computer 1912. The computer 1912 can also include a processing unit 1914, a system memory 1916, and a system bus 1918. The system bus 1918 couples system components including, but not limited to, the system memory 1916 to the processing unit 1914. The processing unit 1914 can be any of various available processors. Dual microprocessors and other multiprocessor architectures also can be employed as the processing unit 1914. The system bus 1918 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1094), and Small Computer Systems Interface (SCSI). The system memory 1916 can also include volatile memory 1920 and nonvolatile memory 1922. The basic input/output system (BIOS), containing the basic routines to transfer information between elements within the computer 1912, such as during start-up, is stored in nonvolatile memory 1922. By way of illustration, and not limitation, nonvolatile memory 1922 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1920 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1912 can also include removable/non-removable, volatile/non-volatile computer storage media. FIG. 19 illustrates, for example, a disk storage 1924. Disk storage 1924 can also include, but is not limited to, devices like a magnetic disk drive, floppy disk drive, tape drive, Jaz drive, Zip drive, LS-100 drive, flash memory card, or memory stick. The disk storage 1924 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1924 to the system bus 1918, a removable or non-removable interface is typically used, such as interface 1926. FIG. 19 also depicts software that acts as an intermediary between users and the basic computer resources described in the suitable operating environment 1901. Such software can also include, for example, an operating system 1928. Operating system 1928, which can be stored on disk storage 1924, acts to control and allocate resources of the computer 1912. System applications 1930 take advantage of the management of resources by operating system 1928 through program modules 1932 and program data 1934, e.g., stored either in system memory 1916 or on disk storage 1924. It is to be appreciated that this disclosure can be implemented with various operating systems or combinations of operating systems. A user enters commands or information into the computer 1912 through input device(s) 1936. Input devices 1936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1914 through the system bus 1918 via interface port(s) 1938. Interface port(s) 1938 include, for example, a serial port, a parallel port, a game port, and a universal serial bus (USB). Output device(s) 1940 use some of the same type of ports as input device(s) 1936. Thus, for example, a USB port can be used to provide input to computer 1912, and to output information from computer 1912 to an output device 1940. Output adapter 1942 is provided to illustrate that there are some output devices 1940 like monitors, speakers, and printers, among other output devices 1940, which require special adapters. The output adapters 1942 include, by way of illustration and not limitation, video and sound cards that provide a means of connection between the output device 1940 and the system bus 1918. It should be noted that other devices and/or systems of devices provide both input and output capabilities such as remote computer(s) 1944.

Computer 1912 can operate in a networked environment using logical connections to one or more remote computers, such as remote computer(s) 1944. The remote computer(s) 1944 can be a computer, a server, a router, a network PC, a workstation, a microprocessor based appliance, a peer device or other common network neuron and the like, and typically can also include many or all of the elements described relative to computer 1912. For purposes of brevity, only a memory storage device 1946 is illustrated with remote computer(s) 1944. Remote computer(s) 1944 is logically connected to computer 1912 through a network interface 1948 and then physically connected via communication connection 1950. Network interface 1948 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1950 refers to the hardware/software employed to connect the network interface 1948 to the system bus 1918. While communication connection 1950 is shown for illustrative clarity inside computer 1912, it can also be external to computer 1912. The hardware/software for connection to the network interface 1948 can also include, for exemplary purposes only, internal and external technologies such as, modems including regular telephone grade modems, cable modems and DSL modems, ISDN adapters, and Ethernet cards.

Embodiments of the present invention can be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components; and
   a processor that executes the computer executable components stored in the memory, wherein the computer executable components comprise:
   an initialization component that selects an initial value of an output limit, wherein the output limit indicates a range for an output of an activation function of a neural network;
   a training component that modifies the initial value of the output limit during training to a second value of the output limit, the second value of the output limit being provided as a parameter to the activation function; and
   an activation function component that determines the output of the activation function based on using the second value of the output limit as the parameter, wherein the training component utilizes a greater precision than a precision of the activation function component.

2. The system of claim 1, wherein the training component utilizes a resolution parameter that has a greater precision than the precision of the activation function component, and wherein the training component utilizes a resolution slope parameter that indicates a slope within a sub-resolution range.

3. The system of claim 2, wherein the training component increases a value of the resolution slope parameter toward infinity during training.

4. The system of claim 1, wherein the computer executable components further comprise:
   a clipping component that performs clipping during training with the training component to reduce accuracy degradation due to quantization.

5. The system of claim 1, wherein the computer executable components further comprise:
   a back-propagation component that performs back propagation during training with the training component.

6. The system of claim 1, wherein the computer executable components further comprise:
   an activation function selection component that determines to use a rectifier linear unit as the activation function in a case of full precision, and wherein cross entropy loss converges as the output limit increases.

7. The system of claim 1, wherein the computer executable components further comprise:
   an activation function selection component that determines that as the output limit increases, a loss function also increases with quantization, and determines to use an activation function type of the activation function that is other than a rectifier linear unit.

8. A computer-implemented method, comprising:
   initializing, by a system operatively coupled to a processor, a value for an output limit, wherein the output limit comprises a range for an output of an activation function of a neural network, the value for the output limit being determined via training;
   determining, by the system, the output of the activation function given the value of the output limit as a parameter to the activation function; and
   determining, by the system, that as the output limit increases, a loss function also increases with quantization, and determining to use an activation function type of the activation function that is other than a rectifier linear unit.

9. The computer-implemented method of claim 8, further comprising:
   applying, by the system, a stochastic gradient descent approach during the training.

10. The computer-implemented method of claim 8, further comprising:
    determining, by the system, the value for the output limit based on performing the training with an initial value of the output limit.

11. The computer-implemented method of claim 8, further comprising:
    regularizing, by the system, the output limit during the training.

12. The computer-implemented method of claim 8, further comprising:
    clipping, by the system, during the training to reduce accuracy degradation due to quantization.

13. The computer-implemented method of claim 8, further comprising:
    employing, by the system, back propagation during the training.

14. The computer-implemented method of claim 8, further comprising:
    determining, by the system, to use a rectifier linear unit as the activation function in a case of full precision, and wherein cross entropy loss converges as the output limit increases.

15. A computer program product that facilitates training quantized activations for efficient implementation of deep learning, the computer program product comprising a computer readable storage medium having program instructions embodied therewith, the program instructions executable by a processor to cause the processor to at least:
    initialize a value for an output limit, wherein the output limit comprises a range for an output of an activation function of a neural network, the value for the output limit being determined via training;
    determine the output of the activation function given the value of the output limit as a parameter to the activation function; and
    regularize the output limit during the training.

16. The computer program product of claim 15, wherein the output limit is expressed as $\alpha$, and wherein the activation function is expressed with equations comprising:

$$y = 0.5(|x| - |x - \alpha| + \alpha) = \begin{cases} \alpha, & x \in [\alpha, +\infty) \\ x, & x \in [0, \alpha) \\ 0, & x \in (-\infty, 0) \end{cases}$$

and $$\frac{dy}{d\alpha} = \begin{cases} 1, & x \in [\alpha, +\infty) \\ 0, & \text{otherwise} \end{cases}.$$

wherein x and y represent a horizontal axis and a vertical axis of a graph, respectively, and wherein $\alpha$ represents a range of an output of the activation function.

17. The computer program product of claim 15, wherein the value of the output limit is larger than a second value of the output limit, and wherein training comprises setting the output limit to a plurality of successive values that are smaller than the value of the output limit and larger than the second value of the output limit.

18. The computer program product of claim 15, wherein the program instructions are further executable by the processor to cause the processor to at least:

determine that as the output limit increases, a loss function also increases with quantization; and
determine to use an activation function type of the activation function that is other than a rectifier linear unit.

19. A system, comprising:
a memory that stores computer executable components; and
a processor that executes the computer executable components stored in the memory, wherein the computer executable components comprise:
an initialization component that selects a value for an output limit, wherein the output limit comprises a range for an output of an activation function of a neural network, the value for the output limit being determined via training;
an activation function component that determines the output of the activation function given the value of the output limit as a parameter to the activation function, wherein the output of the activation function ranges between zero and the output limit, inclusive, and wherein the output of the activation function is a linear function based on the output of the activation function being between zero and the output limit.

20. A computer-implemented method, comprising:
initializing, by a system operatively coupled to a processor, an initial value of an output limit, wherein the output limit comprises a range for an output of an activation function of a neural network;
modifying, by the system, the initial value of the output limit during training to a second value of the output limit, the second value of the output limit being provided as a parameter to the activation function;
determining, by the system, the output of the activation function given the second value of the output limit as the parameter; and
determining, by the system, the output of the activation function based on using the second value of the output limit as the parameter, wherein the training component utilizes a greater precision than a precision of the activation function component.

21. The computer-implemented method of claim 20, further comprising:
performing, by the system, clipping during the training to reduce accuracy degradation due to quantization.

* * * * *